(12) United States Patent
Liu et al.

(10) Patent No.: US 12,074,804 B2
(45) Date of Patent: Aug. 27, 2024

(54) SERVICE TRANSMITTING METHOD AND DEVICE, AND SERVICE RECEIVING METHOD AND DEVICE

(71) Applicant: ZTE CORPORATION, Guangdong (CN)

(72) Inventors: Feng Liu, Guangdong (CN); Wei Wu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 43 days.

(21) Appl. No.: 16/967,791

(22) PCT Filed: Feb. 18, 2019

(86) PCT No.: PCT/CN2019/075393
§ 371 (c)(1),
(2) Date: Aug. 6, 2020

(87) PCT Pub. No.: WO2019/165908
PCT Pub. Date: Sep. 6, 2019

(65) Prior Publication Data
US 2021/0399992 A1    Dec. 23, 2021

(30) Foreign Application Priority Data

Mar. 1, 2018 (CN) .......................... 201810170556.3

(51) Int. Cl.
*H04L 47/41* (2022.01)
*H04B 10/50* (2013.01)
(Continued)

(52) U.S. Cl.
CPC ............. *H04L 47/41* (2013.01); *H04B 10/50* (2013.01); *H04B 10/60* (2013.01); *H04L 1/0071* (2013.01)

(58) Field of Classification Search
CPC ....... H04B 10/50; H04B 10/60; H04L 1/0071; H04L 47/41
See application file for complete search history.

(56) References Cited

U.S. PATENT DOCUMENTS 9,497,064 B2    11/2016   Su et al.
10,256,915 B2    4/2019   Su et al.
(Continued)

FOREIGN PATENT DOCUMENTS

CN    102439995 A    5/2012
CN    102820951 A    12/2012
(Continued)

OTHER PUBLICATIONS

Optical Internetworking Forum, "Flex Ethernet Implementation Agreement", Mar. 2016, All Pages (Year: 2016).*
(Continued)

*Primary Examiner* — Pranesh K Barua
(74) *Attorney, Agent, or Firm* — Li & Cai Intellectual Property (USA) Office

(57) ABSTRACT

Provided are a service transmitting method and device, and a service receiving method and device. The service transmitting method comprises steps of: mapping a client service to at least one service flow of a first rate; dividing at least one service flow of the first rate into a plurality of service flows of other rates, and filling the service flows of other rates with overhead blocks; and transmitting the service flows through channels of corresponding rates. By means of the scheme according to the embodiment, a service transmission between members of different rates can be implemented.

11 Claims, 14 Drawing Sheets

(51) Int. Cl.
*H04B 10/60* (2013.01)
*H04L 1/00* (2006.01)

(56) References Cited

U.S. PATENT DOCUMENTS

| | | |
|---|---|---|
| 2007/0189336 A1 | 8/2007 | Zou |
| 2010/0221005 A1 | 9/2010 | Zhao |
| 2013/0259484 A1 | 10/2013 | Kawahara et al. |
| 2015/0078406 A1* | 3/2015 | Caggioni ............ H04J 3/1664 370/537 |
| 2015/0098703 A1* | 4/2015 | Wu .................... H04Q 11/0066 398/66 |
| 2015/0104186 A1 | 4/2015 | Zhang et al. |
| 2017/0324472 A1* | 11/2017 | Kitamura ............ H04L 27/2601 |
| 2020/0280371 A1* | 9/2020 | Su ..................... H04Q 11/0062 |

FOREIGN PATENT DOCUMENTS

| | | |
|---|---|---|
| CN | 106559141 A | 4/2017 |
| CN | 106803814 A | 6/2017 |
| CN | 106911426 A | 6/2017 |
| CN | 107105355 A | 8/2017 |
| CN | 107566074 A | 1/2018 |
| WO | WO 2017070851 A1 | 5/2017 |

OTHER PUBLICATIONS

China Patent Office, First Office Action issued on Jun. 21, 2021 regarding CN201810170556.3.
WIPO, International Search Report issued on May 5, 2019.
European Patent Office, Extended European Search Report regarding EP19761658.4 issued on Sep. 14, 2021.

* cited by examiner

SERVICE TRANSMITTING METHOD AND DEVICE, AND SERVICE RECEIVING METHOD AND DEVICE

FIELD OF THE INVENTION

The present disclosure relates to communication technologies, and in particular, to a service transmitting method and device, and a service receiving method and device.

BACKGROUND

In order to transmit 400G service on the 100G optical modules, the International Standardization Organization (ISO) defines a FlexE (Flexible Ethernet) protocol. The FlexE protocol allows for bundling a plurality of 100G optical modules to form a high speed transmission channel. As shown in FIG. 1, four 100G optical modules are bundled by using the FlexE protocol to form a 400G transmission channel which is equivalent to the transmission speed of a single 400G optical module, and thus the transmission requirement of 400G service can be met without increasing cost. The current FlexE protocol V1.0 standard defines a 100G physical layer in which 20 time slots are further defined. Requirements of FlexE application scenario of PHY (physical layer) members having rates of 25G and 50G are proposed in the market. Frame structures of the FlexE members having rates of 25G and 50G are defined by taking a frame structure of the FlexE member having the rate of 100G as reference. However, there is no specific method about service transmission between members having different rates.

SUMMARY

At least one embodiment of the present disclosure provides a service transmitting method and device, and a service receiving method and device to implement a service transmission between members of different rates.

In order to achieve the objectives of the present disclosure, according to at least one embodiment of the present disclosure, there is provided a service transmitting method, including: mapping a client service to at least one service flow of a first rate; dividing the at least one service flow of the first rate into a plurality of service flows of other rates, and filling the service flows of other rates with overhead blocks; and transmitting the service flows through channel of corresponding rates.

According to at least one embodiment of the present disclosure, there is provided a service transmitting device, including a memory and a processor, where the memory stores a program, and the program, when read and executed by the processor, implements the service transmission method according to any one of the embodiments.

According to at least one embodiment of the present disclosure, there is provided a service receiving method, including: interleaving a plurality of service flows of a rate lower than a first rate to form a service flow of the first rate; filling the service flow of the first rate with an overhead block content; and restoring a client service from the service flow of the first rate.

According to at least one embodiment of the present disclosure, there is provided a service receiving device, including a memory and a processor, where the memory stores a program, and the program, when read and executed by the processor, implements the service receiving method according to any one of the embodiments.

Compared to the related art, according to at least one embodiment of the present disclosure, a client service is mapped to at least one service flow of a first rate; the at least one service flow of the first rate is divided into a plurality of service flows of other rates, the service flows of other rates are filled with overhead blocks; and the service flows are transmitted over channels of corresponding rates. By means of the scheme according to the present embodiment, a service transmission between members of different rates can be implemented.

Other features and advantages of the present disclosure will be described hereinafter in the description, and will become in part obvious from the description, or may be learned from the implementation of the present disclosure. The objectives and other advantages of the present disclosure may be realized and attained by the structure particularly pointed out in the description and claims as well as accompany drawings.

BRIEF DESCRIPTION OF THE DRAWINGS

The accompanying drawings are included to provide a further understanding of the schemes of the present disclosure and constitute a part of the specification for illustrating the schemes of the present disclosure together with the embodiments, which are not intended to limit the present disclosure.

DETAILED DESCRIPTION OF THE EMBODIMENTS

In order that the objectives, technical schemes and advantages of the present disclosure become apparent, embodiments of the present disclosure will be described in detail below with reference to the accompanying drawings. It should be noted that the embodiments and features of the embodiments in the present disclosure may be arbitrarily combined with each other without conflict.

Steps illustrated in the flow chart of the drawings may be performed in a computer system such as a set of computer-executable instructions. Further, although a logical order is shown in the flow chart, in some cases, the steps shown or described may be performed in an order otherwise than here.

Figure 1:
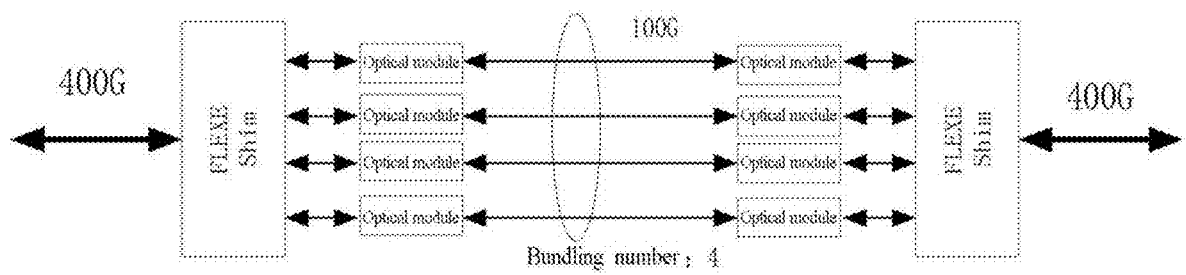
FIG. 1 is a schematic diagram illustrating a FlexE protocol application in the related art.
Figure 2:
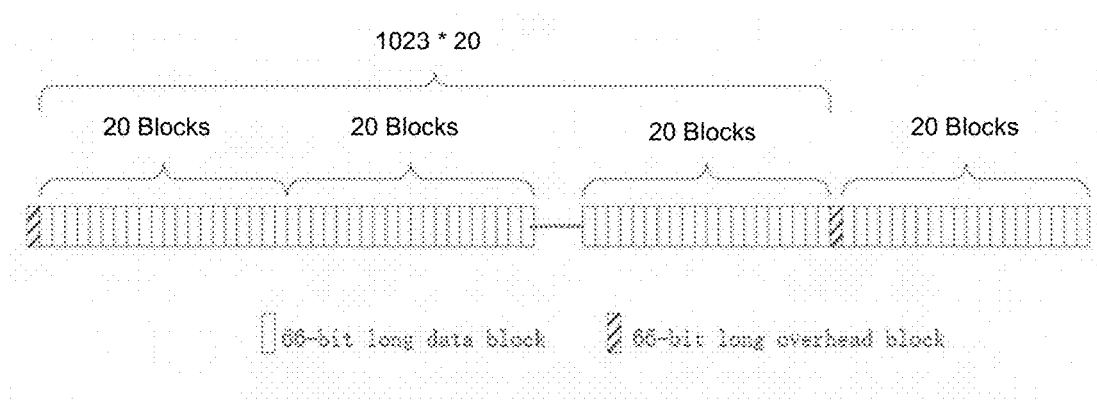
FIG. 2 is a schematic diagram illustrating an arrangement position of overhead blocks and data blocks of FlexE protocol (100 G).

Currently, the FlexE protocol is defined in terms of a physical layer having a rate of 100 G. In the optical module, before the transmission of a 100 G data message, 64/66 encoding is performed on a data packet message such that a 64-bit data block is expanded into a 66-bit data block. The added 2 bits are positioned at the forefront of the 66-bit block to serve as a leading flag of the 66-bit block. Then the data message is sent from an optical port in the form of the 66-bit block. During the reception, the optical port recognizes the 66-bit block from the received data flow, and then restores the original 64-bit data from the 66-bit block to reassemble the data message. The FlexE protocol is in a conversion layer from 64-bit block to 66-bit block, which sorts and plans the 66-bit data block before sending. As shown in FIG. 2, for a 100 G service, every 20 66-bit data blocks are grouped into a data block group, every 66-bit data block indicates a time slot, every data block group indicates 20 time slots, and every time slot indicates a service speed of 5G bandwidth. During the transmission of the 66-bit data block, a FlexE overhead block (diagonally filled block in FIG. 2) is inserted after every 1023 data block groups (i.e., 1023*20 data blocks) are transmitted. After the overhead block is inserted, the data block is continued to be transmitted, and after subsequent 1023*20 data blocks are transmitted, subsequent overhead block is inserted. In a similar fashion, in the process of transmitting the data blocks, the overhead blocks are periodically inserted, and an interval between two adjacent overhead blocks is 1023*20 data blocks.

Figures 3, 4:
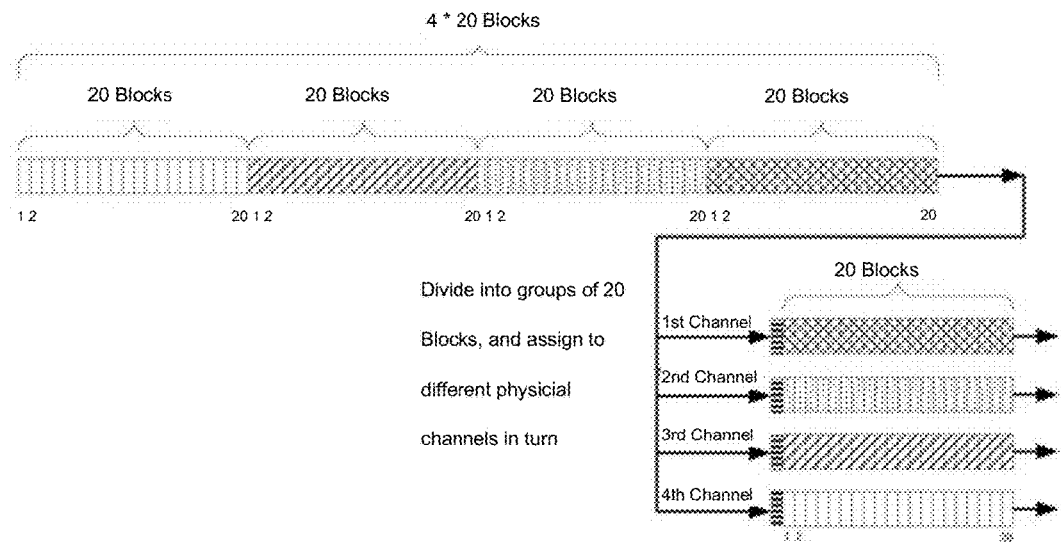
FIG. 3 is a schematic diagram illustrating an allocation of services of the FlexE protocol (100 G) over multiple physical channels.
FIG. 4 is a schematic diagram illustrating a frame structure of the FlexE protocol (100 G).

When 4 channels of 100 G physical layers are bundled into a 400 G logical service bandwidth, as shown in FIG. 3, each physical layer still forms a data block group by 20 data blocks, and an overhead block is inserted into every 1023 data block groups. In a master calendar (located in shim layer) of an FlexE, 4 channels of 20 data blocks are formed into a data block group formed by 80 data blocks, and the data block group has 80 time slots. The client service is transmitted in the 80 time slots, wherein each slot has a bandwidth of 5G, and the 80 slots have a service transmission bandwidth of 400 G.

The FlexE overhead block is a 66-bit long overhead block, and an overhead block is inserted at an interval of every 1023*20 data blocks when the service data flow is transmitted. The overhead block has a positioning function in the whole service flow, A position of the first data block group in the service and a position of the subsequent data block group can be known when the position of the overhead block is determined. In the FlexE protocol, 8 overhead blocks are defined to form a frame called as an overhead frame. As shown in FIG. 4, an overhead block comprises a 2-bit block flag and 64-bit block content. The block flag is located in the first 2 columns, and the block content is located in the subsequent 64 columns. The block flag for the first overhead block in the overhead frame is 10 and the block flags for the subsequent 7 overhead blocks are 01 or SS (SS indicates uncertain content). When a designated position of an overhead block is 4B (hexadecimal, identified as 0*4B) and 05 (hexadecimal, identified as 0*5), it indicates that the overhead block is the first overhead block of the overhead frame and the subsequent 7 overhead blocks form an overhead frame. The first overhead block includes the following information: 0*4B (8 bits, 4B in hexadecimal), C bit (1 bit, an adjustment control indication), OMF bit (1 bit, an overhead frame multi-frame indication), RPF bit (1 bit, a distal end defect indication), RES bit (1 bit, a reserved bit), FlexE group number (20 bits, a serial number of a bundling group), 0*5 (4 bits, 5 in hexadecimal), 000000 (28 bits, all are 0). Herein, 0*4B and 0*5 are flag indications of the first overhead block. During the reception, when the corresponding positions of 0*4B and 0*5 are found, it indicates that the overhead block is the first overhead block of the overhead frame and then the subsequent 7 overhead blocks are formed as the overhead frame. In the overhead frame, the reserved portion is reserved and is not yet defined. The PHY number indicates a number of the PHY (physical layer) of the member in the group, a range of which is 0 to 255. The PHY map (bitmap) indicates the bit status of each PHY in the group. The PHY map has 8 bits in a single frame, and accordingly a multi-frame formed by 32 frames has 256 bits, which indicates whether 256 PHY members are in the group. If so, a corresponding position is set to "1", or set to "0". There are 20 time slots in a FlexE frame having a rate of 100 G. Each of the time slots can bear client information, and a name of the client born in each slot is indicated by a Client calendar. A single frame bears the client name of a time slot, and a multi-frame can bear 32 time slots. However there are only 20 time slots in actual in which the first 20 slots are valid, and the subsequent 16 slots are reserved. The time slot bearing Client name is represented by Client calendar A and Client calendar B. During the normal operation, only one group indicates an operating state (a group indicated by C bit is in the operating state), and the other group is in a standby state. Two groups of indications are used for dynamical adjustment of the time slots. When configuration of the slots is changed, contents of only the slots in the standby state are changed. Then two sides are simultaneously switched to a new configuration table. For contents of other bytes in the overhead frame, reference can be made to the techniques in the related art.

Figure 5:
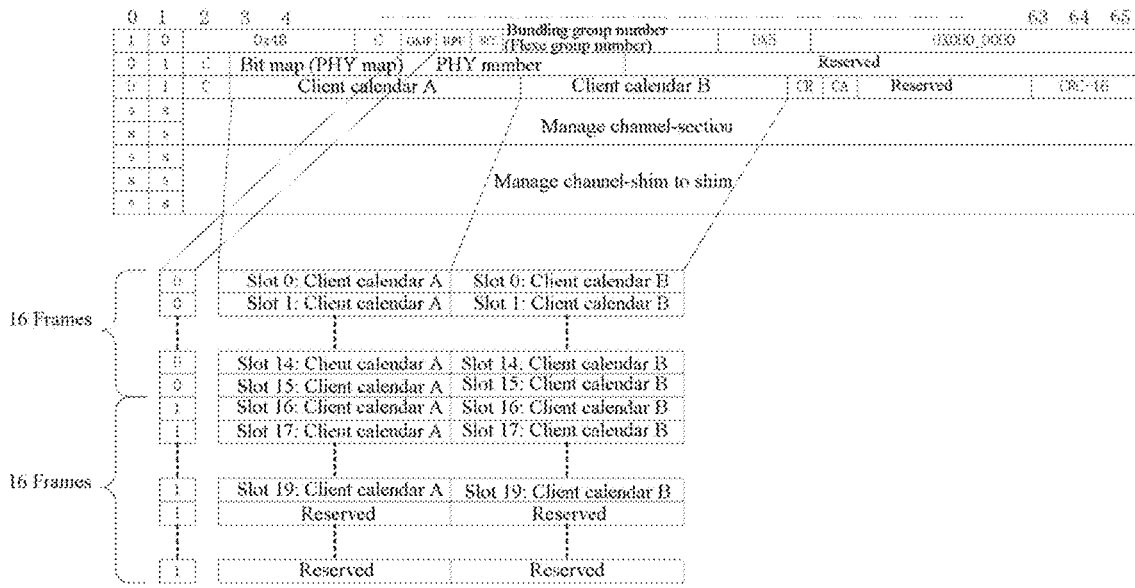
FIG. 5 is a diagram illustrating a multi-frame structure of the FlexE protocol (100 G).

In the first overhead block, the OMF field is a multi-frame indication signal, as shown in FIG. 5. OMF is a single bit value. In a 100 G frame structure, OMF is 0 in 16 consecutive frames, then OMF is 1 in 16 consecutive frames, then 0 in 16 consecutive frames, and then 1 in 16 consecutive frames, which is repeated once for every 32 frames. In such a manner, 32 frames form a multi-frame which has 8*32 overhead blocks.

Figure 6:
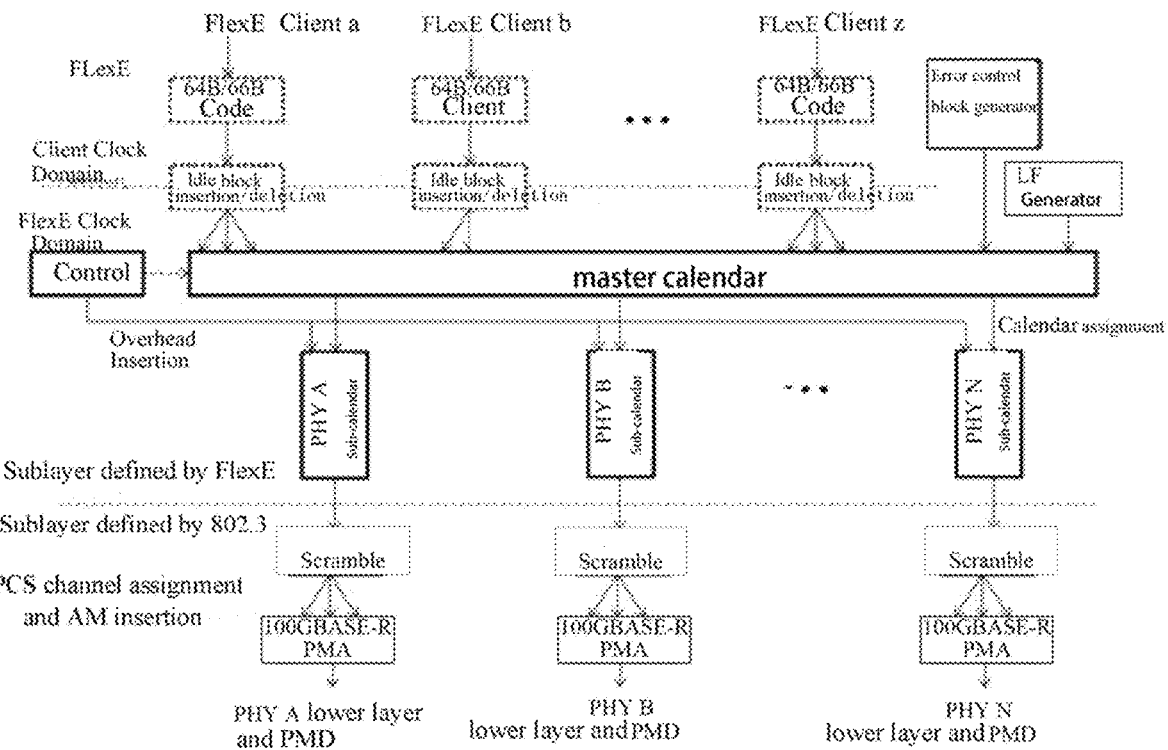
FIG. 6 is a schematic diagram illustrating a client service bearing access of the FlexE protocol.

FIG. 6 is a schematic diagram illustrating a process of an FlexE protocol bearing a client service. As shown in FIG. 6, at the first place, 64/66 encoding is performed on the client service, such that a client service flow is cut into bit blocks with a length of 64-bit (8-byte), and then 64-bit data information is encoded to 66-bit data blocks. The service flow has converted to a flow of data blocks with a length of 66-bit after 64/66 encoding. Idle information blocks are inserted into or deleted from the data block flow. Speed adjustment is performed to adapt to a rate of a master calendar in the FlexE protocol. The 66-bit data block is placed in a master calendar of the FlexE protocol according to the slot configuration. The structure of the slot planning table is shown in FIG. 5. Each member in the FlexE protocol is grouped with 20 time slots (in which each time slot is a 66-bit data block and indicates a 5G service bandwidth). In the case of 4 members, there are 80 time slots in the slot planning table. Through configuration, a time slot can be selected for each client service to bear. All the time slots are grouped in the slot planning table in which each group has 20 time slot to be sent to each member defined in the FlexE protocol. A FlexE overhead block is inserted to the members (herein, a single overhead block, which is also a 66-bit block, is inserted at an interval of every 20*1023 time slot blocks, referring to FIG. 2) on the basis of these slots. In the figure, each member is a sub-calendar, the transmission of which is borne on a PHY. After the FlexE overhead block is inserted, each PHY scrambles the service flow borne thereon and sends it through a PMA (Physical Medium Attachment).

Figure 7:
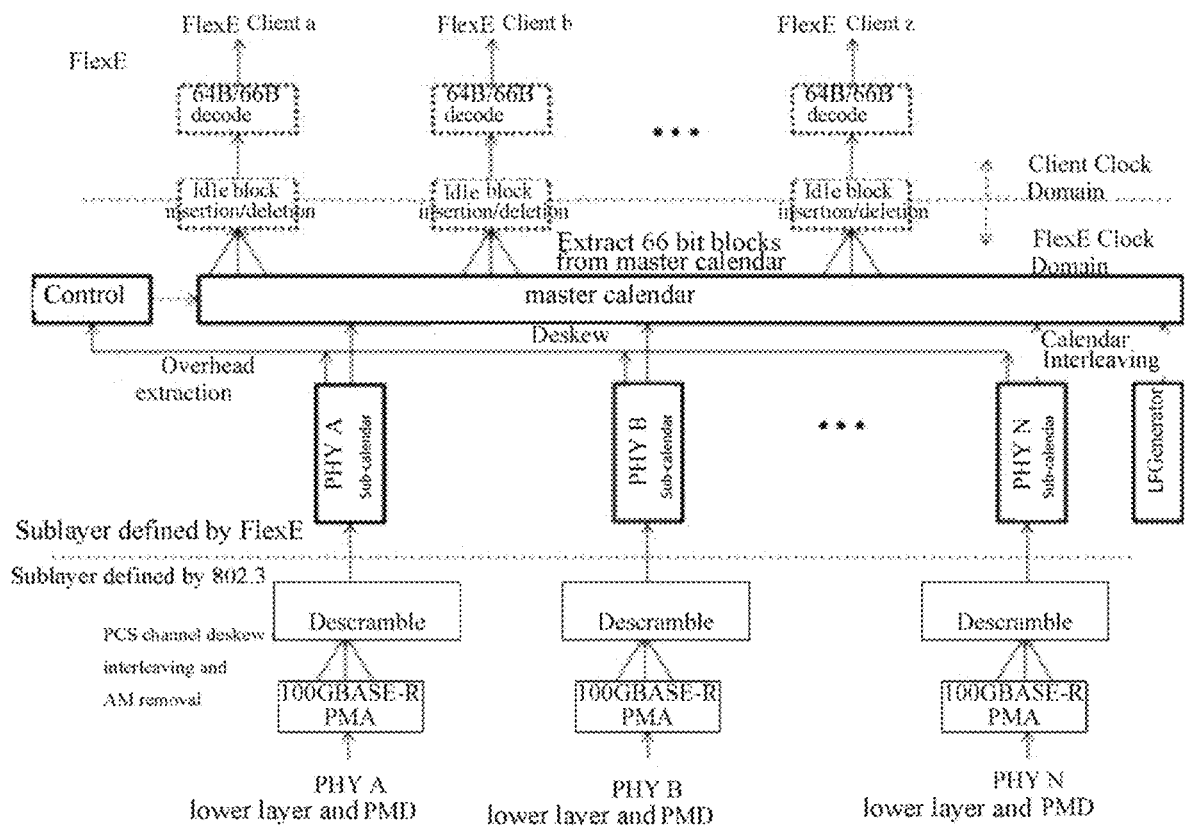
FIG. 7 is a schematic diagram illustrating a client service bearing recovery of the FlexE protocol.

At a reception end, as shown in FIG. 7, the PMA receives a signal and restores the 66-bit block through descrambles. In a 66-bit block, each PHY searches for the overhead block of the FlexE protocol and restores a frame structure of the FlexE by using the overhead block as a reference position to obtain the sub-calendar. Time slots of all the members are arranged in sequence to restore the master calendar structure. According to the configuration information, the service flow can be taken out of the corresponding slot of the master calendar with the idle information block removed, and then the 66/64-bit decoding is performed to restore the original client service.

Figure 8:
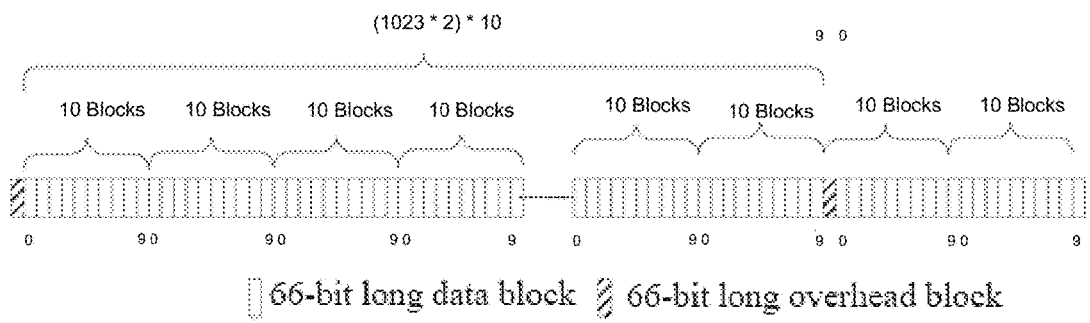
FIG. 8 is a schematic diagram illustrating an arrangement position of overhead blocks and data blocks of FlexE protocol (50 G).
Figure 9:
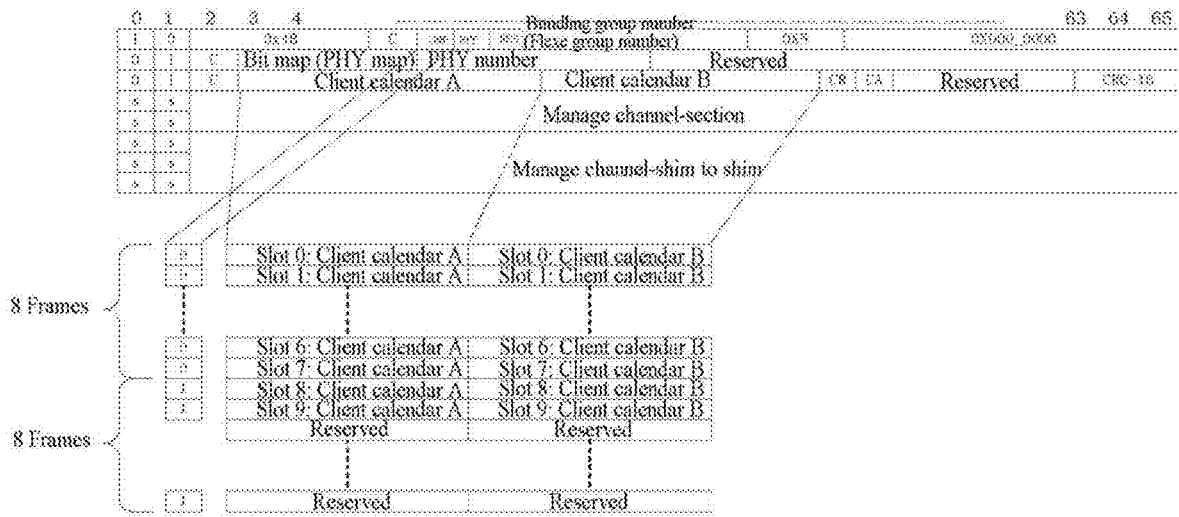
FIG. 9 is a schematic diagram illustrating a multi-frame structure of Client calendars of the FlexE protocol (50 G).
Figure 10:
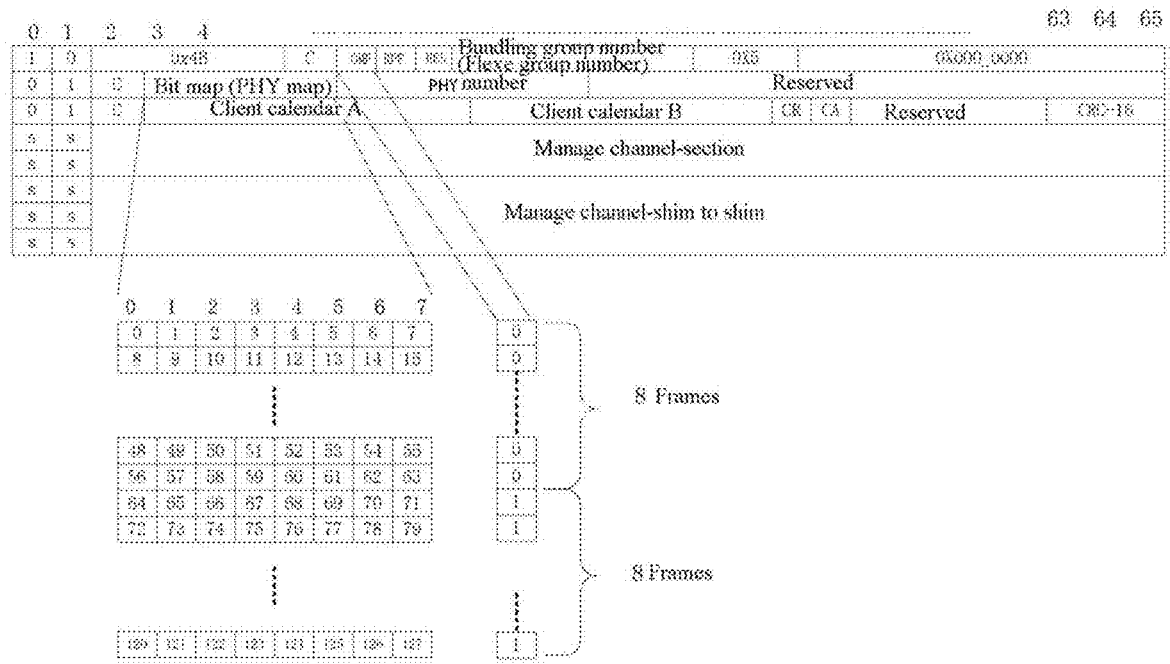
FIG. 10 is a schematic diagram illustrating a multi-frame structure of PHY map of the FlexE protocol (50 G).

For a PHY member having a rate of 50 G, a relationship of the data block and the overhead block is as shown in FIG. 8. Herein, a number of time slots is 10, a FlexE overhead block is inserted at an interval of every 1023*2*10 data blocks, a ratio of the overhead block and the data block is 1:(1023*2*10), which is exactly consistent with the ratio of 1:(1023*20) of the overhead block and the data block for the member having a rate of 100 G. Similarly to the rate of 100 G, the 8 overhead blocks form a FlexE frame, as shown in FIG. 9. Content of the frame structure is consistent with the frame structure of the rate of 100 G FlexE. The difference therebetween is in three fields, i.e., the OMF field, the PHY map and the Client calendar: the OMF field (consisting of 8 consecutive "0"s and 8 consecutive "1"s) indicates a multi-frame structure, and the number of frames of the multi-frame changes from 32 to 16. In other words, 16 frames form a single multi-frame, and there are 8*16 overhead blocks in a multi-frame. In the multi-frame mode, the maximum number of group members is reduced by half from 256 to 128, and thus a total number of bits of the PHY map is reduced from 256 to 128, as shown in FIG. 9. Since the number of slots is 10, there are 16 Client calendar fields, in which the first 10 fields indicate a Client ID of 10 slots and the subsequent 6 fields are reserved fields, as shown in FIG. 10.

Figure 11:
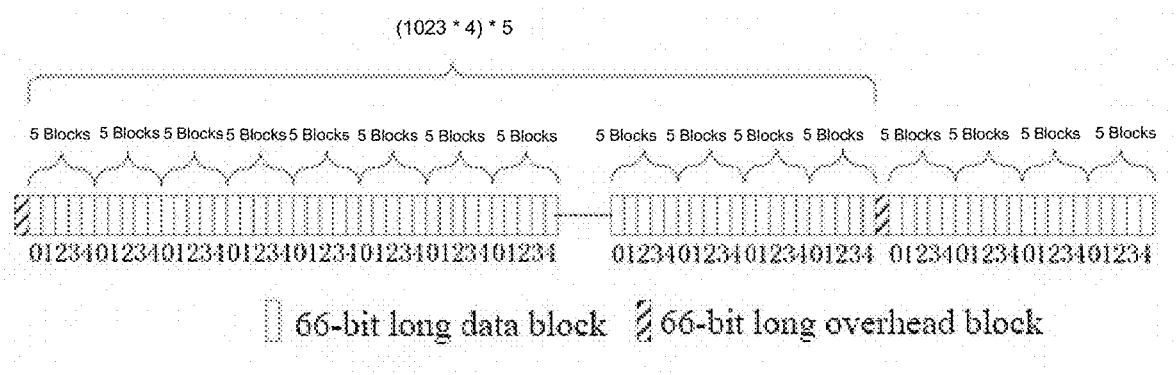
FIG. 11 is a schematic diagram illustrating a arrangement position of overhead blocks and data blocks of a FlexE protocol (25 G).
Figure 12:
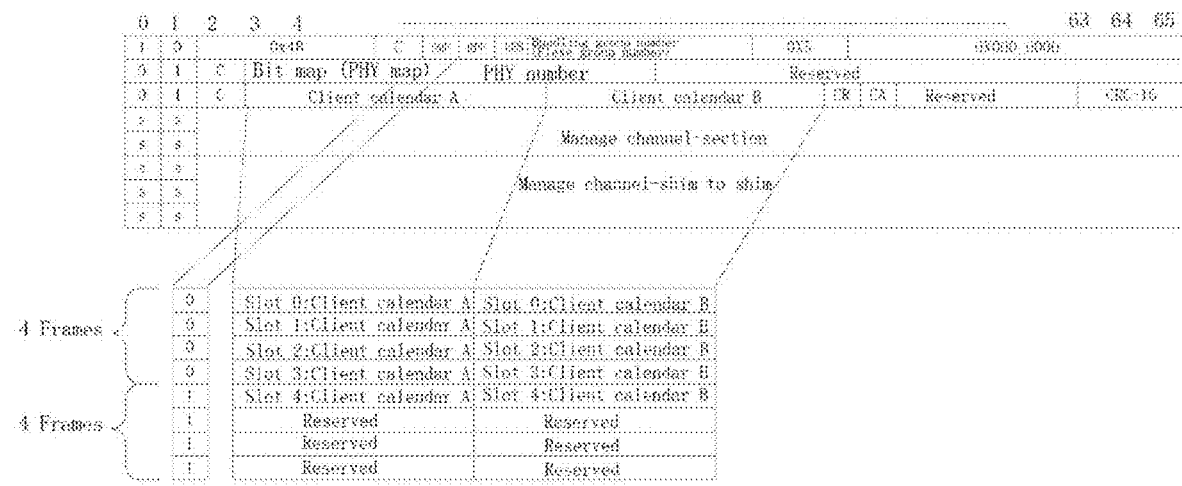
FIG. 12 is a schematic diagram illustrating a multi-frame structure of Client calendars of the FlexE protocol (25 G).
Figure 13:
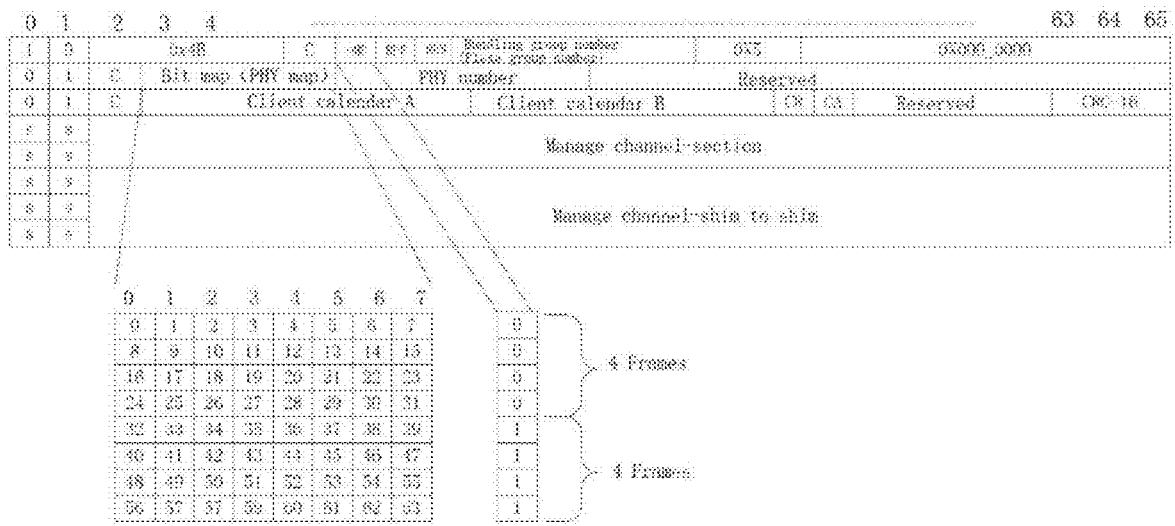
FIG. 13 is a schematic diagram illustrating a multi-frame structure of PHY map of the FlexE protocol (25 G).

For a PHY member having a rate of 25 G, a relationship of the data block and the overhead block is as shown in FIG. 11. Herein, a number of time slots is 5, a FlexE overhead block is inserted at an interval of every 1023*4 data blocks, a ratio of the overhead block and the data block is 1:(1023*4*5), which is exactly consistent with the ratio of 1:(1023*20) of the overhead block and the data block for the member having a rate of 100 G. Similarly to the rate of 100 G, the 8 overhead blocks form a FlexE frame, as shown in FIG. 12. Content of the frame structure is consistent with the frame structure of the rate of 100 G FlexE. The difference therebetween is in three fields, i.e., the OMF field, the PHY map and the Client calendar: the OMF field (consisting of 4 consecutive "0"s and 4 consecutive "1"s) indicates a multi-frame structure, and the number of frames of the multi-frame changes from 32 to 8. In other words, 8 overhead frames form a single multi-frame, and there are 8*8 overhead blocks in a multi-frame. In the multi-frame, the maximum number of group members is reduced from 256 to 64, and thus a total number of bits of the PHY map is reduced from 256 to 64. Since the number of slots is 5, there are 8 Client calendar fields, in which the first 5 fields indicate a Client ID of 5 slots and the subsequent 3 fields are reserved fields, as shown in FIG. 13.

Figure 14:
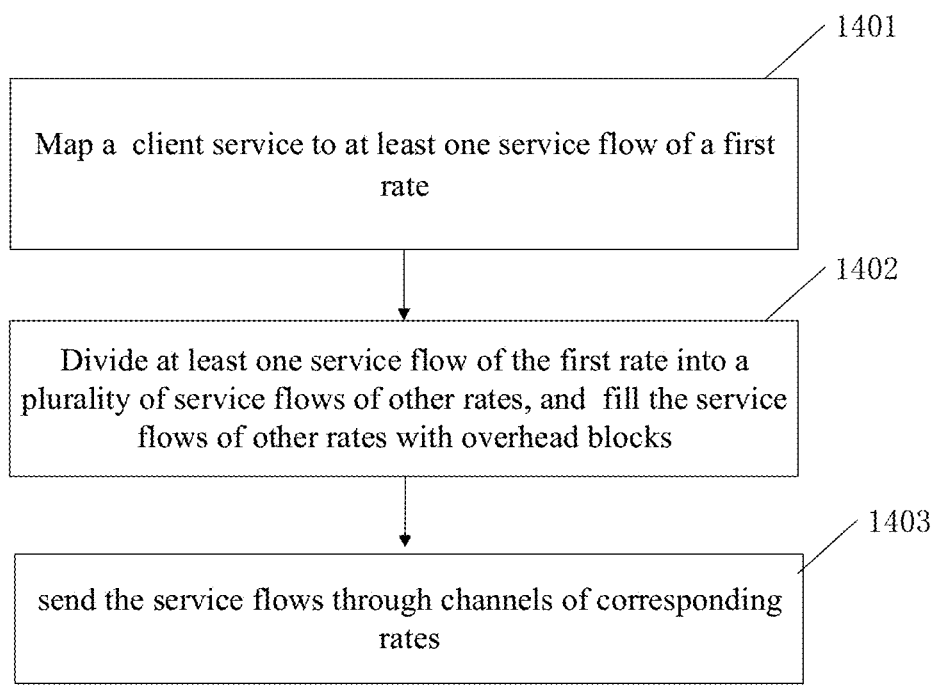
FIG. 14 is a flow diagram illustrating a service transmitting method according to an embodiment of the present disclosure.

In an embodiment of the present disclosure, there is provided a service transmitting method, as shown in FIG. 14, including:

Step 1401, mapping and dividing a client service into at least one service flow of a first rate.

For example, the client service is mapped to a master calendar for bearing, and then the master calendar is divided into a plurality of sub-calendar member having a rate of 100 G according to a protocol standard.

As another example, the client service is mapped to a master calendar for bearing, and then the master calendar is divided into a plurality of sub-calendar members having a rate of 50 G.

Step 1402, dividing the at least one service flow of the first rate into a plurality of service flows of other rates, and filling the service flows of other rates with overhead blocks.

For example, a sub-calendar member having a rate of 100 G is divided into two service flows having a rate of 50 G.

Step 1403, transmitting the service flows through channels of corresponding rates.

For example, a 100 G service flow is transmitted through a 100 G optical module; the 50 G service flow is transmitted through a 50 G optical module; and the 25 G service flow is transmitted through a 25 G optical module.

In an embodiment, the step of dividing at least one service flow of the first rate into a plurality of service flows of other rates includes:

dividing at least one service flow having a rate of 100 G into two service flows having a rate of 50 G; or dividing at least one service flow having a rate of 100 G into four service flows having a rate of 25 G; or dividing at least one service flow having a rate of 100 G into two service flows having a rate of 50 G, and dividing one of service flows having the rate of 50 G into two service flows having a rate of 25 G; in other words, dividing the service flow having the rate of 100 G into one service flow having the rate of 50 G and two service flows having the rate of 25 G; or dividing at least one service flow having the rate of 50 G into two service flows having the rate of 25 G.

A single service flow of 100 G may be divided, or a plurality of service flows of 100 G may be divided.

In one embodiment, the step of dividing at least one service flow of the first rate into the plurality of service flows of other rates includes:

dividing the data blocks of the service flow of the first rate into a plurality of service flows of a second rate according to an interleaved sequence by taking one data block as a unit, and reserving blank overhead blocks at positions in the service flow of the second rate corresponding to the overhead blocks of the service flow of the first rate, wherein one data block has 66 bits; the first rate is, for example, 100 G, the second rate is, for example, 50 G, and when the data block is divided into 2 flows, the even data blocks are formed as a service flow and the odd data blocks are formed as a service flow; when the data block is divided into 4 flows, the 0th, 4th, 8th, 12th . . . data blocks are formed as a service flow, and the 1st, 5th, 9th, 13th . . . data blocks are formed as a service flow, the 2nd, 6th, 10th, 14th . . . data blocks are formed as a service flow, and the 3rd, 7th, 11th, 15th . . . data blocks are formed as a service flow; or dividing the data blocks of the service flow of the first rate into a plurality of service flows of a second rate according to an interleaved sequence by taking one data block as a unit, and reserving blank overhead blocks at positions in the service flow of the second rate corresponding to the overhead blocks of the service flow of the first rate; and dividing the data blocks of the service flow of the second rate into a plurality of service flows of a third rate according to an interleaved sequence by taking one data block as a unit, and reserving blank overhead blocks at positions in the service flow of the third rate corresponding to the overhead blocks of the service flow of the second rate. For example, the first rate is 100 G, a second rate is 50 G, and a third rate is 25 G; for example, even data blocks are formed as a service flow having a rate of 50 G, and odd data blocks are formed as a service flow having a rate of 50 G; and then one of the service flows having the rate of 50 G is selected, the even data blocks of the service flow having the rate of 50 G are formed as a service flow having a rate of 25 G, and the odd data blocks of the service flow having the rate of 50 G are formed as a service flow having a rate of 25 G. It should be noted that, the 100 G-rate service flow may also be directly divided into a 50 G-rate service flow and two 25 G-rate service flows. For example, even data blocks are formed as a 50 G-rate service flow, (4N+1)th data blocks are formed as a 25 G-rate service flow, and (4N+3)th data blocks are formed as a 25 G-rate service flow.

In the process of division, only the data blocks are divided and the overhead blocks are not divided. A position of the overhead block is still kept in the divided service flows, and each service flow keeps the same position of the overhead block.

In an embodiment, the step of filling the service flows of other rates with overhead blocks includes at least one of:

when a service flow having a rate of 100 G is divided into two service flows having a rate of 50 G, from the first (namely, the $0^{th}$) overhead block position of the multi-frame, only filling overhead blocks at even overhead block positions with overhead block content, that is to say, only filling the overhead block content at the 0th, 2nd, 4th, 6th . . . 30th overhead block positions; and discarding overhead blocks which are not filled with the overhead block content, wherein lower 7-bit contents of a C-bit field, an RPF field, a CR field, a CA field and a PHY number field filled in the overhead blocks come from the corresponding contents of the overhead block corresponding to the overhead block position in the at least one service flow having the rate of 100 G; the highest bit of the PHY number field is filled with indication information for distinguishing the service flows; rest field contents of the overhead blocks in the first service flow having the rate of 50 G come from the corresponding field of the overhead blocks of an even frame in the at least one service flow having the rate of 100 G; and rest field contents of the overhead blocks in the second service flow having the rate of 50 G come from the corresponding field of the overhead blocks of an odd frame in the at least one service flow having the rate of 100 G; for example, if the 100 G service flow is divided into two 50 G service flows, the Client calendar in the first 50 G service flow comes from the Client calendar of the 0th, 2nd, 4th, 6th frame in the original multi-frame; and the second 50G service flow comes from the Client calendar of the 1st, 3rd, 5th and 7th frames in the original multi-frame;

when a service flow having a rate of 50 G is divided into two service flows having a rate of 25 G, from the first (namely, the $0^{th}$) overhead block position of a multi-frame, only filling the overhead blocks at even overhead block positions with overhead block content, that is to say, only filling overhead block contents at the 0th, 2nd, 4th, 6th . . . 14th overhead block positions (even overhead blocks); and discarding overhead blocks which are not filled with the overhead block content, wherein lower 7-bit contents of a C-bit field, an RPF field, a CR field, a CA field and a PHY number field filled in the overhead block come from the corresponding contents of the overhead block corresponding to the overhead block position in the service flow having the rate of 50 G; the highest bit of the PHY number field is filled with indication information for distinguishing the service flows, rest field contents of the overhead block in the first service flow having the rate of 25 G come from the corresponding field of the overhead block of an even frame in the service flow having the rate of 50 G; and rest field contents of the overhead block in the second service flow having the rate of 25 G come from the corresponding field of the overhead block of an odd frame in the service flow having the rate of 50 G; and when a service flow having a rate of 100 G is divided into four service flows having a rate of 25 G, from the first (namely, the $0^{th}$) overhead block position of the multi-frame, only filling the overhead block at a position that is an integral multiple of 4 with overhead block content, that is to say, only filling the overhead block content at the 0th, 4th, 8th, 12th . . . 28th overhead block positions (at an interval of every 4 overhead blocks); and discarding overhead blocks which are not filled with the overhead block content, wherein lower 6-bit contents of a C-bit field, an RPF field, a CR field, a CA field and a PHY number field filled in the overhead block come from the corresponding content of the overhead block corresponding to the overhead block position in the at least one service flow having the first rate; the highest 2 bits of the PHY number field are filled with indication information for distinguishing service flows, rest field contents of the overhead block in the first service flow having the rate of 25 G come from the corresponding content of an overhead block of the 4Nth frame in the service flow having the rate of 100 G, where N is an integer greater than or equal to 0; rest field contents of the overhead block in the second service flow having the rate of 25 G come from the corresponding field of an overhead block of the (4N+1)th frame in the service flow having the rate of 100 G; rest field contents of the overhead block in the third service flow having the rate of 25 G come from the corresponding field of an overhead block of the (4N+2)th frame in the service flow having the rate of 100 G; rest field contents of overhead block in the fourth service flow having the rate of 25 G come from the corresponding field of an overhead block of the (4N+3)th frame in the service flow having the rate of 100 G. For example, in the case that the 100 G rate service flow is divided into four 25 G service flows, the Client calendar in the first 25 G-rate service flow comes from the Client calendars of the 0th, 4th, 8th, 12th . . . frames in the original multi-frame; the Client calendar in the second 25 G-rate service flow coming from the Client calendars of the 1st, 5th, 9th, 13th . . . frames in the original multi-frame; the Client calendar in the third 25 G-rate service flow coming from the Client calendars of the 2nd, 6th, 10th, 14th . . . frames in the original multi-frame; and the fourth Client calendar in the 25 G-rate service flow coming from the Client calendars of the 3rd, 7th, 11th, 15th . . . frames in the original multi-frame.

Figure 15:
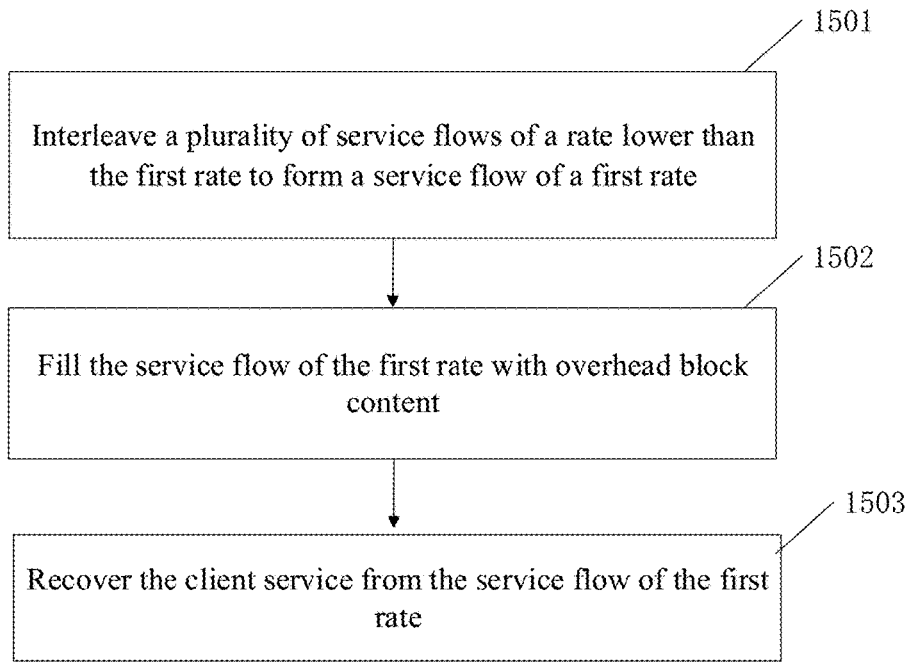
FIG. 15 is a flow diagram illustrating a service receiving method according to an embodiment of the present disclosure.

As shown in FIG. 15, in an embodiment of the present disclosure, there is provided a service receiving method, including:

Step 1501, interleaving a plurality of service flows having a rate lower than the first rate to form a service flow of the first rate, wherein a sum of the rates of the plurality of service flows is the first rate;

Step 1502, filling the service flow of the first rate with overhead block content; and Step 1503, restoring a client service from the service flow of the first rate, wherein a single service flow of the first rate is a sub-calendar member, at least one sub-calendar member is restored to the master calendar, and the client service is extracted and restored from the master calendar.

In an embodiment, the step of interleaving the plurality of service flows of the rate lower than the first rate into the service flow of the first rate includes:

interleaving two service flows having a rate of 50 G to form a service flow having a rate of 100 G; or interleaving four service flows having a rate of 25 G to form a service flow having a rate of 100 G; or interleaving two service flows having a rate of 25 G to form a service flow having a rate of 50 G, and interleaving the service flow having a rate of 50 G with another service flow having a rate of 50 G to form a service flow having a rate of 100 G.

The step of interleaving may be performed by taking one bit or one data block as a unit. In an embodiment, the step of interleaving the plurality of service flows of the rate lower than the first rate to form the service flow of the first rate includes:

interleaving the service flows in an interleaved manner by taking one data block as a unit after aligning multi-frame boundaries of the service flows, and dispersing interleaved overhead blocks such that adjacent overhead blocks are spaced at an interval of 1023*20 data blocks, wherein the overhead block positions are reserved after the overhead blocks are interleaved, and then the successive overhead blocks are moved and dispersed evenly. For example, if there are two successive overhead blocks, the latter overhead block is moved backward by 1023*20 data block positions; if there are four successive overhead blocks, then one overhead block is moved backward by 1023*20 block positions, one overhead block is moved backward by 2*1023*20 block positions, and one overhead block is moved backward by 3*1023*20 block positions, such that all overhead blocks are equally spaced at the interval of 1023*20 data blocks after movement.

In an embodiment, the step of filling the service flow of the first rate with overhead block content includes at least one of:

when two service flows having a rate of 50 G are interleaved to form a service flow having a rate of 100 G, from the multi-frame boundary, sequentially filling the overhead block contents in the multi-frame of the first service flow having the rate of 50 G in a position corresponding to an overhead block in an even frame of the multi-frame of the service flow having the rate of 100 G, sequentially filling the overhead block content in the multi-frame of the second service flow having the rate of 50 G in a position corresponding to an overhead block in an odd frame in the multi-frame of the service flow having the rate of 100 G; and clearing the highest bit of the PHY number field; for example, sequentially filling the overhead block contents in the multi-frame of the first 50 G-service flow into positions corresponding to the overhead blocks in the 0th, 2nd, 4th, 6th, 8th . . . 30th frames of the multi-frame of the 100 G service flow; and sequentially filling the overhead block contents in the multi-frame of the second 50 G service flow into positions corresponding to the overhead blocks in the 1st, 3rd, 5th, 7th, 9th . . . 31st frames of the multi-frame of the 100 G service flow;

when four service flows having a rate of 25 G are interleaved to form a service flow having a rate of 100 G, from the multi-frame boundary, sequentially filling overhead block contents in the multi-frame of the first service flow having the rate of 25 G in a position corresponding to an overhead block in a 4Nth frame of the multi-frame of the service flow having the rate of 100 G, wherein N is an integer greater than or equal to 0; in other words, for example, filling the contents of 8 overhead blocks in each frame of the multi-frame of the first 25 G service flow into positions corresponding to overhead blocks in the 0th, 4th, 8th, 12th, 16th . . . 28th frames of multi-frame of the 100 G service flow; filling the overhead block content in the multi-frame of the second service flow having the rate of 25 G in a position corresponding to an overhead block in a (4N+1)th frame of the multi-frame of the service flow having the rate of 100 G; in other words, for example, filling the contents of 8 overhead blocks in each frame of the multi-frame of second 25 G service flow into positions corresponding to the overhead blocks in the 1st, 5th, 9th, 13th, 17th . . . 29th frames of the multi-frame of the 100 G service flow; filling overhead block contents in the multi-frame of the third service flow having the rate of 25 G in a position corresponding to an overhead block in a (4N+2)th frame of the multi-frame of the service flow having the rate of 100 G; in other words, for example, filling the contents of 8 overhead blocks in each frame of the multi-frame of the third 25 G service flow into positions corresponding to the overhead blocks in the 2nd, 6th, 10th, 14th, 18th . . . 30th frames of the multi-frame of the 100 G service flow; filling overhead block contents in the multi-frame of the fourth service flow having the rate of 25 G in a position corresponding to the overhead block in a (4N+3)th frame of the multi-frame of the service flow having the rate of 100 G; in other words, for example, filling the contents of 8 overhead blocks in each frame of the multi-frame of the fourth 25 G service flow into positions corresponding of the overhead blocks in the 3rd, 7th, 11th, 15th, 19th . . . 31st frames of the multi-frame of the 100 G service flow; and clearing the highest 2 bits of the PHY number field;

when two service flows having a rate of 25 G are interleaved to form a service flow having a rate of 50 G, sequentially filling overhead block contents in the multi-frame of the first service flow having the rate of 25 G in a position corresponding to an overhead block in an even frame of the multi-frame of the service flow having the rate of 50 G; in other words, for example, filling the contents of 8 overhead blocks in each frame of the multi-frame of the first 25 G service flow into positions corresponding to overhead blocks in the 0th, 2nd, 4th, 6th, 8th . . . 14th frames of the multi-frame of the 100 G service flow; sequentially filling overhead block contents in the multi-frame of the second service flow having the rate of 25 G in a position corresponding to the overhead block in an odd frame of the multi-frame of the service flow having the rate of 50 G; in other words, for example, filling the contents of 8 overhead blocks in each frame of multi-frame of the second 25 G service flow into positions corresponding to the overhead blocks in the 1st, 3rd, 5th, 7th, 9th, 15th frames of the multi-frame of the 50 G service flow; and clearing the highest 2 bits of the PHY number field.

Figure 16:
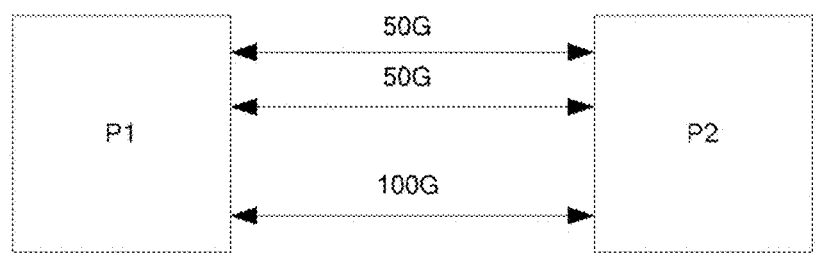
FIG. 16 is a diagram illustrating a bundling group formed by 50 G rate and 100 G rate according to an embodiment of the present disclosure.
Figure 17:
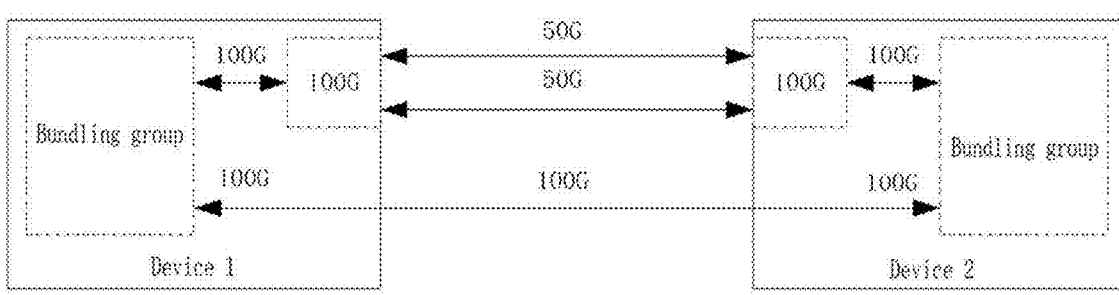
FIG. 17 is a schematic diagram illustrating an implementation of a bundling group formed by 50 G rate and 100 G rate according to an embodiment of the present disclosure.
Figure 18:
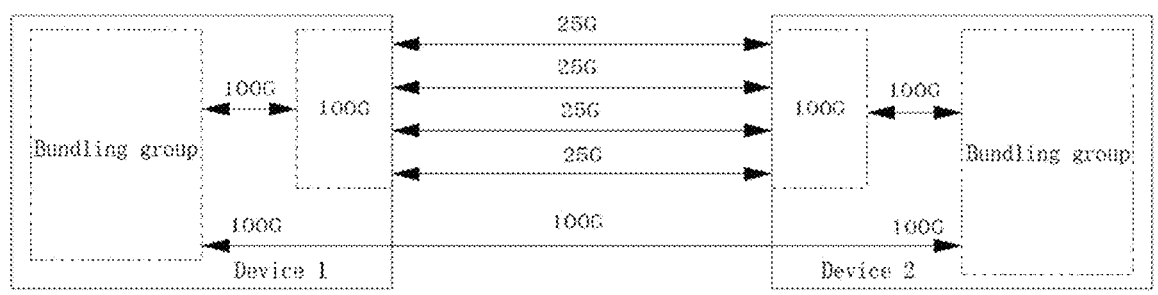
FIG. 18 is a schematic diagram illustrating an implementation of a bundling group formed by 25 G rate and 100 G rate according to an embodiment of the present disclosure.
Figure 19:
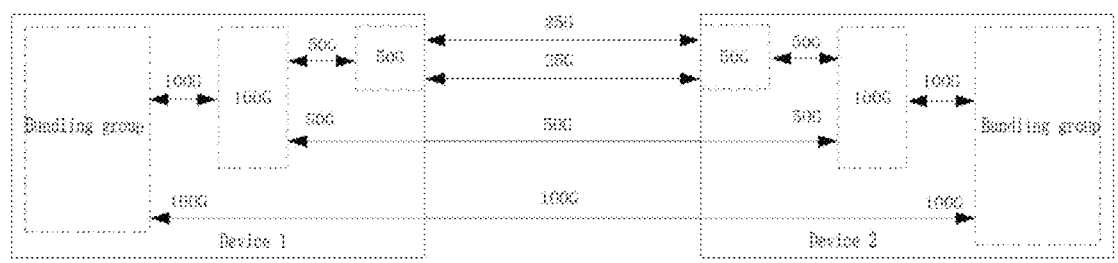
FIG. 19 is a schematic diagram illustrating an implementation of a bundling group formed by three rates (25 G rate, 50 G rate, and 100 G rate) according to an embodiment of the present disclosure.

Since the PHY having a rate of 50 G has a different number of the time slots and a different multi-frame structure from the PHY having a rate of 100 G, the PHYs of different rates cannot be directly bundled to form a group, as shown in FIG. 16. If two PHY members having the rate of 50 G are processed into a single PHY member structure having a rate of 100 G, a group can be formed of other 100 G-rate PHY members according to the existing standard content, and the bundling of the 50 G-rate PHY members and the 100 G-rate PHY into a group can be implemented, as shown in FIG. 17. Similarly, when the 25 G-rate PHY and the 100 G-rate PHY are bundled, the four 25 G-rate PHYs are processed into a 100 G-rate PHY member structure and then formed as a group with another 100 G-rate PHY member, as shown in FIG. 18; when the 25 G-rate PHYs are bundled with the 50 G-rate PHY and 100 G-rate PHY, two 25 G-rate PHYs are processed into a 50 G-rate PHY member structure, and then processed into a 100 G-rate PHY member structure with another 50 G-rate PHY member, and then formed as a group with another 100 G-rate PHY member, as shown in FIG. 19.

Implementations of interleaving and de-interleaving for different rates will be described in detail by way of examples below.

Figure 20:
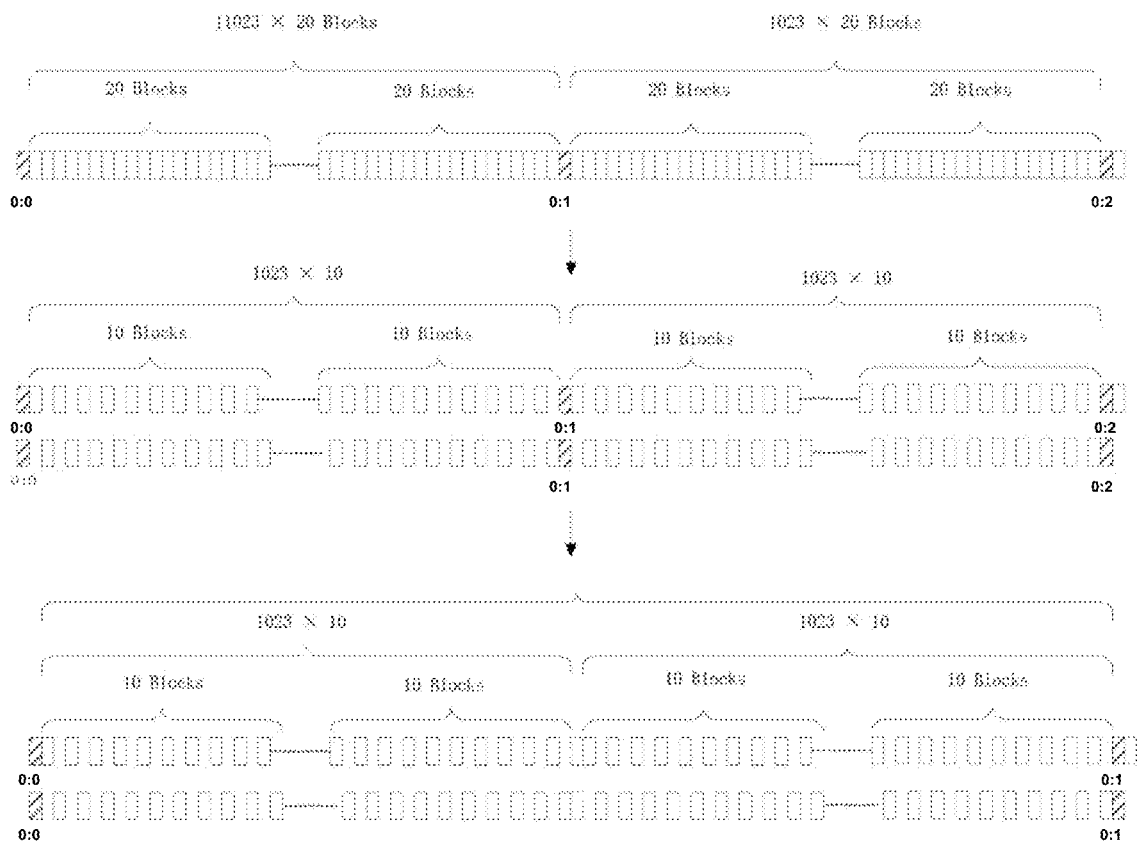
FIG. 20 is a schematic diagram illustrating a structure in which a 100 G-rate service is de-interleaved into 50 G-rate services according to an embodiment of the present disclosure.

A 100 G service flow is de-interleaved into two 50 G service flows, as shown in FIG. 20. An overhead block is arranged in a 100 G-rate FlexE service flow at an interval of every 1023*20 data blocks, every 8 overhead blocks form a frame, and every 32 frames form a multi-frame. There are 8*32 overhead blocks in a single multi-frame, and the overhead blocks are indicated by an array (frame sequence number: intra-frame overhead block sequence number): 0:0, 0:1, 0:2, 0:3, 0:4, 0:5, 0:6, 0:7, 1:0, 1:1, 1:2, 1:3, 1:4, 1:5, 1:6, 1:7 . . . 31:0, 31:1, 31:2, 31:3, 31:4, 31:5, 31:6, 31:7, with a total of 256 overhead blocks. The frame structure formed by 8 overhead blocks in each frame is shown in FIG. 4, and the multi-frame structure formed by 32 frames is shown in FIG. 5. A data block of a time slot portion is de-interleaved (divided according to a reverse process of interleaving) by taking 66-bit blocks as a unit, to be divided into two groups of service flows. Only the content of the data portion of the time slot portion is de-interleaved and the FlexE overhead block portion remains at idle positions, as in the middle portion of FIG. 20. There are 20 time slots in the 100 G FlexE service, from 0 to 19. After de-interleaving, the first service flow reserves the even time slots, 0, 2, 4 . . . 18, in the original service flow; the second service flow reserves the odd time slots, 1, 3, 5 . . . 19, in the original service flow. The overhead block content is filled in two divided groups of service flows. The method of filling the overhead block content includes the following steps.

The first overhead block position (overhead array 0:0) in the original multi-frame is used as the first overhead block position in the new two service flow multi-frames.

Only the positions of the even blocks in the original overhead blocks are filled with overhead blocks with the positions of the odd blocks not filled, such as 0:0, 0:2, 0:4, 0:6, 1:0, 1:2, 1:4, 1:6 . . . 31:0, 31:2, 31:4, 31:6. Each 50 G service flow of the multi-frame is filled with 128 overhead blocks, which are a half of the overhead blocks of a 100 G service flow of the multi-frame. Other overhead blocks which are not filled with the overhead block content are directly deleted.

In the overhead blocks of the 50 G service flow, the corresponding contents in the original overhead block are directly copied for a C bit, an RPF field, a CR field and a CA field. Low 7 bits (0-6 bits) of the PHY number field are copied directly from the low 0-6 bits of the PHY number field of the original overhead block. High bits of the PHY number field indicate service flows. For example, the 7th bit (i.e., the highest bit) of the PHY number field in the first 50 G service flow is set to 0, and the 7th bit (i.e., the highest bit) of the PHY number field of the second 50 G service flow is set to 1, so as to distinguish the two 50 G service flows. The Client calendar A and the Client calendar B are in a third block of a frame, which comes from the corresponding content of the original overhead block. The overhead fields Client calendar A and Client calendar B in the first 50 G service flow come from the corresponding content of the overhead block of the even frames in the original 100 G service flow, such as the 0th, 2nd, 4th . . . 30th frames; the overhead fields Client calendar A and Client calendar B in the second 50 G service flow come from the corresponding content in the original odd frames in the original 100 G service flow, such as the 1st, 3rd, 5th . . . 31st frames. The processing of the field content of a PHY map, a Management channel-section, and a Management channel-shim to shim and the processing of Client calendar are similar. The field content of the PHY map, the Management channel-section, and the Management channel-shim to shim in the first 50 G service flow come from corresponding content in overhead blocks of even frames in the original 100 G service flow, such as the 0th, 2nd, 4th . . . 30th frames; the overhead fields of the PHY map, the Management channel-section, and the Management channel-shim to shim in the second 50 G service flow come from the corresponding content in the original odd frames in the original 100 G service flow, such as the 1st, 3rd, 5th . . . 31st frames.

The 50 G-rate FlexE service formed by filling the FlexE overhead blocks (the overhead block position where content is not filled is directly deleted) is transmitted over two 50 G-rate lines.

Figure 21:
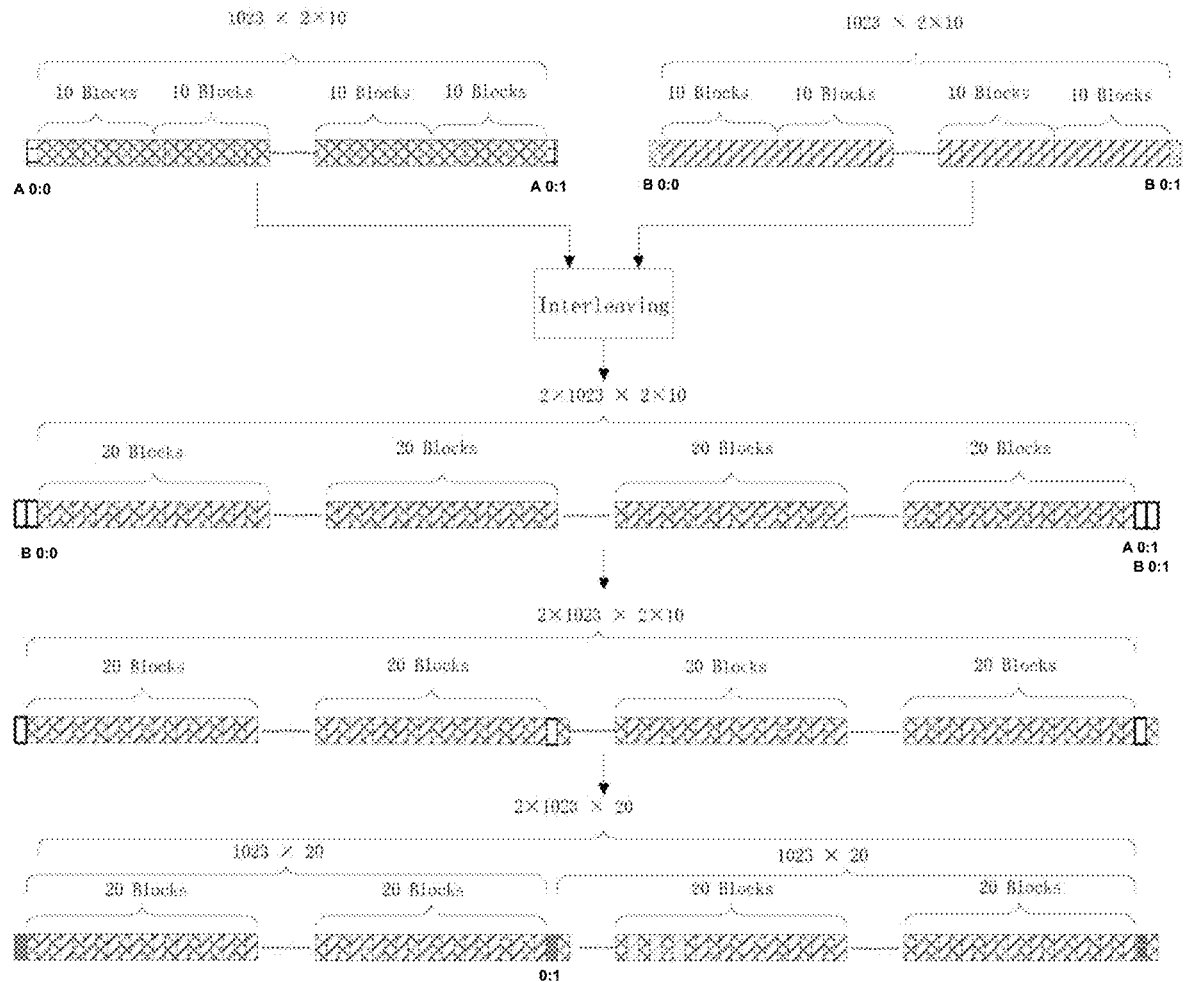
FIG. 21 is a schematic diagram illustrating a structure in which 50 G-rate services are interleaved into a 100 G-rate service according to an embodiment of the present disclosure.

The process of interleaving two 50 G service flows into a 100 G service flow is as follows. An overhead block is arranged at an interval of every 1023*2*10 data blocks in a 50 G-rate FlexE service flow, as shown in FIG. 21. Two 50 G-rate FlexE service flows are aligned with reference to FlexE overhead block positions (multi-frame boundaries), and then interleaved by taking 66-bit blocks as a unit to form a 100 G service flow. After interleaving, the data block is the result of interleaving the data blocks in the two 50 G service flows. After interleaving, the overhead block only reserves the overhead block position, and the overhead block content is not filled temporarily, as shown in FIG. 21. A service flow having a rate of 100 G is obtained after interleaving, with two overhead block positions presented at an interval of every 2*1023*2*10 data blocks. One of two consecutive overhead blocks is moved back by 1023*2*10 blocks so that one FlexE overhead block position is presented at an interval of every 1023*2*10 blocks. The content defined by the FlexE V1.0 standard can be met by merely filling the overhead block content. Herein, the rule of filling the 100 G service flow in the overhead block position with content will be described hereinafter.

By taking a multi-frame as a unit, 8 overhead blocks in each frame of a first 50 G service flow are filled in 8 overhead block positions in an even frame in a 100 G service flow, and 8 overhead blocks in each frame of a second 50 G service flow are filled in 8 overhead block positions in an odd frame in the 100 G service flow. The specific process will be described below. The 8 overhead blocks of the 0th frame in the multi-frame of the first 50 G service are filled in 8 overhead block positions of the 0th frame in the 100 G service flow (for example, A 0:0 is filled in 0:0, A 0:1 is filled in 0:1, A 0:3 is filled in 0:3 . . . A 0:7 is filled in 0:7), and then the 8 overhead blocks of the 0th frame in the multi-frame of the second 50 G service flow are filled in 8 overhead block positions of the 1st frame in the 100 G service flow (for example, B 0:0 is filled in 1:0, B 0:1 is filled in 1:1, B 0:3 is filled in 1:3 . . . B 0:7 is filled in 1:7). After the first round of filling is finished, the second round of filling starts. 8 overhead blocks of the 1st frame in the multi-frame of first 50 G service flow are filled in 8 overhead block positions of the 2nd frame in the multi-frame of 100 G service flow, and 8 overhead blocks of the 1st frame in the multi-frame of the second 50 G service flow are filled in 8 overhead block positions of the 3rd frame in the multi-frame of the 100 G service flow, and so on.

For a 50 G FlexE frame, the maximum number of the group is 128, so only the low 7-bit field of the PHY number is valid, and the highest bit may be used to indicate the service flow. When the overhead blocks in the 50 G FlexE frame are filled in the 100 G service flow, the highest bit of the PHY number field is set to "0", and other uses are cleared.

A 100 G member FlexE protocol information flow is formed once the overhead block is filled. The client service can be restored by a group formed by the FlexE standard definition content and other 100 G-rate members.

Figure 22:
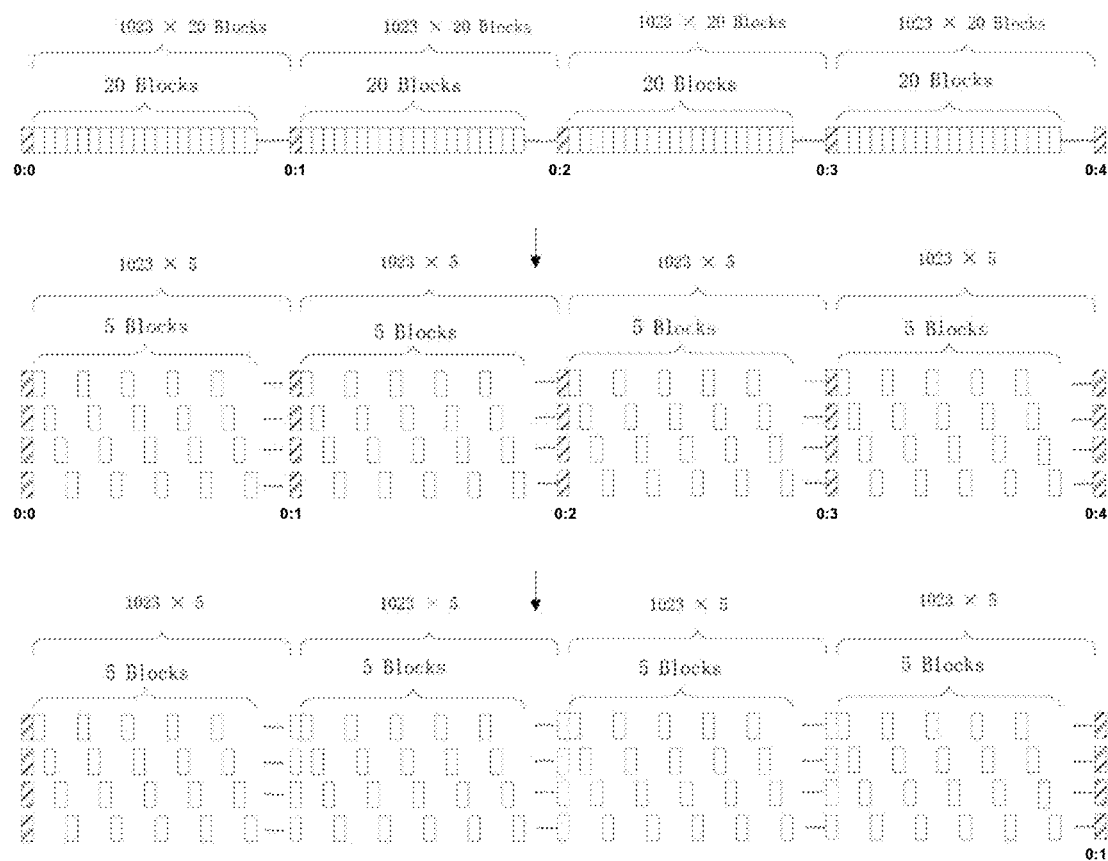
FIG. 22 is a schematic diagram illustrating a structure in which a 100 G-rate service is de-interleaved into 25 G-rate services according to an embodiment of the present disclosure.

A 100 G service flow is de-interleaved into four 25 G service flows, as shown in FIG. 22, the structure of the 100-rate FlexE service is as shown in the upper portion of FIG. 22. An overhead block is arranged at an interval of every 1023*20 data blocks in a 100 G-rate FlexE service flow, every 8 overhead blocks are formed as an overhead frame, and every 32 frames are formed as a multi-frame. There are 8*32 overhead blocks in a multi-frame, and these overhead blocks are indicated by an array (frame sequence number: intra-frame block sequence number): 0:0, 0:1, 0:2, 0:3, 0:4, 0:5, 0:6, 0:7, 1:0, 1:1, 1:2, 1:3, 1:4, 1:5, 1:6, 1:7 . . . 31:0, 31:1, 31:2, 31:3, 31:4, 31:5, 31:6, 31:7, for a total of 256 overhead blocks. The data block of the time slot part is de-interleaved (divided according to the reverse process of interleaving) by taking 66-bit blocks as a unit, and divided into four groups of service flows. Only the content of the data portion of the slot portion is de-interleaved and the FlexE overhead block portion reserves idle positions, as shown in the middle portion of FIG. 22. There are 20 time slots in the 100 G FlexE service, from 0 to 19. After de-interleaving, the first service flow reserves the 0th, 4th, 8th, 12th and 16th time slots in the original service flow; the second service flow reserves the 1st, 5th, 9th, 13th and 17th time slots in the original service flow; the third service flow reserves the 2nd, 6th, 10th, 14th and 18th time slots in the original service flow; and the fourth service flow reserves the 3rd, 7th, 11th, 15th and 19th time slots in the original service flow. The overhead block contents are filled in divided four groups of service flows. The method for filling the overhead block content will be described hereinafter.

The first overhead block position (overhead array 0:0) in the original multi-frame is the first overhead block position in a new service flow multi-frame.

The overhead contents are filled in positions at an interval of every 4 overhead blocks in the original overhead blocks. In other words, the contents are filled in the positions of the 0th, 4th, 8th, 16th, 24th and 28th overhead blocks, and the multi-frame of each 25 G service flow comprises 8 frames. Therefore, 8*8 overhead blocks are filled in total, which is one fourth of the number of the overhead blocks in the multi-frame of 100 G service. Other overhead blocks which are not filled with the overhead block content are directly deleted.

In the process of filing the overhead content, the C bit, an RPF field, a CR field and a CA field are directly copied from the corresponding content in the original overhead block; the lower 0-5 bits of the PHY number field are copied directly from the lower 0-5 bits of the PHY number field of the original overhead block. The upper bits of the PHY number field indicate service flows. For example, the highest 2 bits of the PHY number field of the first 25 G service flow is "00", the highest 2 bits of the PHY number field of the second 25 G service flow is "01", the highest 2 bits of the PHY number field of the third 25 G service flow is "10", and the highest 2 bits of the PHY number field of the fourth 25 G service flow is "11". The highest 2 bits are used to distinguish the four 25 G service flows. The Client calendar A and Client calendar B are positioned in the third block of a frame, which come from the corresponding content of the original overhead block. The overhead fields Client calendar A and Client calendar B in the first 25 G service flow come from the corresponding content in the overhead blocks of the 0th, 4th, 8th, 12th, 16th, 20th, 24th, 28th frames in the original 100 G service flow; the overhead fields Client calendar A and Client calendar B in the second 25 G service flow come from the corresponding content of the 1st, 5th, 9th, 13th, 17th, 21st, 25th, 29th of the original 100 G service flow. The overhead fields Client calendar A and Client calendar B in the third 25 G service flow come from the corresponding content in the overhead blocks of the 2nd, 6th, 10th, 14th, 18th, 22nd, 26th and 30th frames in the original 100 G service flow; and the overhead fields Client calendar A and Client calendar B in the fourth 25 G service flow come from the corresponding content of the 3rd, 7th, 11th, 15th, 19th, 23rd, 27th, 31st of the original 100 G service flow. The processing of field content of a PHY map, a Management channel-section and a Management channel-shim to shim are similar to the processing of Client calendar. The field content of the PHY map, the Management channel-section, and the Management shim-to shim of the first 25 G service flow come from corresponding content in the overhead blocks of the 0th, 4th, 8th, 12th, 16th, 20th, 24th and 28th frames; the overhead fields of the PHY map, the Management-section, and the Management channel-shim to shim in the second 25 G service flow come from the corresponding content of the 1st, 3rd, 5th . . . 31st frame in the original 100 G service flow; the field content of the PHY map, the Manage channel-section and the Manage channel-shim to shim multi-frame in the third 25 G-rate service flow come from the corresponding content in the 2nd, 6th, 10th, 14th, 18th, 22nd, 26th and 30th frames in the original 100 G service flow; the overhead block of the PHY map, the Manage channel-section and the Manage channel-shim to shim in the fourth 25 G service flow come from the corresponding content in the 3rd, 7th, 11th, 15th, 19th, 23rd, 27th and 31st frames in the original 100 G service flow.

The FlexE service forming the 25 G rate after filling the FlexE overhead block content (the overhead block position where content is not filled is directly deleted) is transmitted over four 25 G rate lines.

Figure 23:
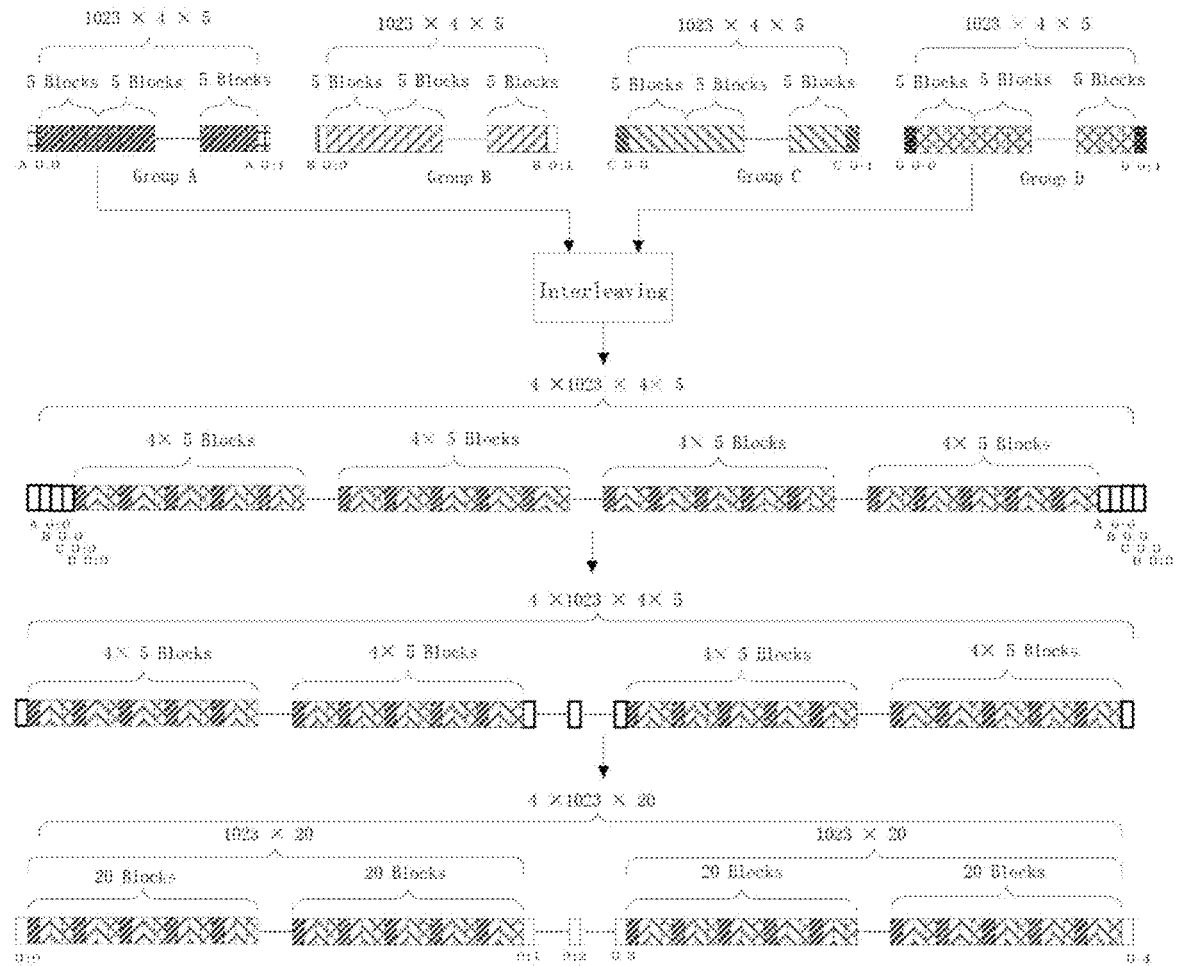
FIG. 23 is a schematic diagram illustrating a structure in which 25 G-rate services are interleaved into a 100 G-rate service according to an embodiment of the present disclosure.

Implementation of interleaving four 25 G service flows into a single 100 G service flow is shown in FIG. 23. There is an overhead block for every 1023*4*5 data blocks in the 25 G-rate FlexE service. The four 25 G-rate FlexE service flows are aligned with reference to the FlexE overhead block position (multi-frame boundary) and then interleaved by taking 66-bit blocks as a unit to form the 100 G service flow. After interleaving, the data block portion is a result of interleaving of data blocks in four 25 G services. The overhead block portion only reserves the position of the overhead block after interleaving, and does not fill the content temporarily. A result after interleaving is shown in FIG. 23. A 100 G service flow is obtained after interleaving, with four overhead block positions presented at an interval of every 4*1023*4*5 data blocks. Three overhead blocks in four consecutive overhead blocks are successively moved back by 1023*4*5 block positions at an equal interval so that a FlexE overhead block position is presented at an interval of every 1023*4*5 blocks. The content defined by the FlexE V1.0 standard can be met by merely filling the overhead block content. The method of filling content in the overhead block position will be described hereinafter.

The filling mode is performed by taking a multi-frame as a unit. 8 overhead blocks in each frame in a multi-frame of the first 25 G service flow are filled in 8 overhead block positions in the 0th, 4th, 8th, 12th, 16th, 20th, 24th and 28th frames in a multi-frame of a 100 G service flow, 8 overhead blocks in each frame of the multi-frame of the second 25 G service flow are filled in 8 overhead block positions in the 1st, 5th, 9th, 13th, 17th, 21st, 25th and 29th frames in the multi-frame of the 100 G service flow, 8 overhead blocks in each frame of the multi-frame of the third 25 G service flow are filled in 8 overhead block positions in the 2nd, 6th, 10th, 14th, 18th, 22nd, 26th and 30th frames in the multi-frame of the 100 G service flow, and 8 overhead blocks in each frame of the multi-frame of the fourth 25 G service flow are filled in 8 overhead block positions in the 3rd, 7th, 11th, 15th, 19th, 23rd, 27th and 31st frames in the multi-frame of the 100 G service flow. For example, the 8 overhead blocks of the 0th frame in the multi-frame of first 25 G service flow are filled in 8 overhead block positions of the 0th frame in the 100 G service flow (e.g., A 0:0 is filled in 0:0, A 0:1 is filled in 0:1, A 0:3 is filled in 0:3 . . . A 0:7 is filled in 0:7), then the 8 overhead blocks of the 0th frame in the multi-frame of the second 25 G service flow are filled in 8 overhead block positions of the 1st frame in the 100 G service flow (e.g., B 0:0 is filled in 1:0, B 0:1 is filled in 1:1, B0:3 is filled in 1:3 . . . B0:7 is filled in 1:7), the 8 overhead blocks of the 0th frame in the multi-frame of the third 25 G service flow are filled in 8 overhead block positions of the 2nd frame in the multi-frame of the 100 G service flow (e.g., C 0:0 is filled in 2:0, C 0:1 is filled in 2:1, C 0:2 is filled in 2:2 . . . C 0:7 is filled in 2:7), and 8 overhead blocks of the 0th frame in the multi-frame of the fourth 25 G service flow are filled in 8 overhead block positions of the 3rd frame in the multi-frame of 100 G service flow (e.g., D 0:0 is filled in 3:0, D 0:1 is filled in 3:1, D 0:2 is filled in 3:2 . . . D 0:7 is filled in 3:7). After completing the first round of filling, a second round of filling process starts, 8 overhead blocks of the 1st frame in the multi-frame of first 25 G service flow are filled in 8 overhead block positions of the 4th frame in the multi-frame of the 100 G service flow, and 8 overhead blocks of the 1st frame in the multi-frame of the second 25 G service flow are filled in 8 overhead block positions of the 5th frame in the multi-frame of the 100 G service flow, in a similar fashion.

For a 25 G FlexE frame, the maximum number of group members is 64. Thus, the PHY number field is only valid in the lower 6 bits (the maximum number of group members is 64), and the highest 2 bits may be used to indicate the service flow. When the overhead blocks in the 25 G FlexE frame are filled in the 100 G service flow, the highest 2 bits of the PHY number field are set to "0", and other usages are cleared.

A 100 G member FlexE protocol information flow is formed after the filling of the overhead block, and a group is formed by using FlexE standard definition content and other 100 G-rate members to perform service recovery and processing.

The processing of de-interleaving a 50 G service into two 25 G services and the processing of interleaving two 25 G services into a 50 G service are similar to the processing of de-interleaving a 100 G service into two 50 G services and the processing of interleaving the two 50 G services into a 100 G service, except that the multi-frame formed by 32 frames is reduced by half into a multi-frame formed by 16 frames, and the multi-frame formed by 16 frames is reduced by half into a multi-frame formed by 8 frames.

When a 50 G service flow is de-interleaved into two 25 G service flows, an overhead block is arranged at an interval of every 1023*2*10 data blocks in the 50 G rate FlexE service flow, with each 8 overhead blocks forming a frame and each 16 frames forming a multi-frame. There are 8*16 overhead blocks in a multi-frame, and these overhead blocks are indicated by an array (frame sequence number: intra-frame overhead block sequence number): 0:0, 0:1, 0:2, 0:3, 0:4, 0:5, 0:6, 0:7, 1:0, 1:1, 1:2, 1:3, 1:4, 1:5, 1:6, 1:7 . . . 15:0, 15:1, 15:2, 15:3, 15:4, 15:5, 15:6, 15:7, for a total of 128 overhead blocks. The data block of the time slot portion is de-interleaved (divided according to the reverse process of interleaving) by taking 66-bit blocks as a unit, and divided into two groups of service flows. Only the content of the data of the time slot portion is de-interleaved, the idle position in the FlexE overhead block portion is reserved. There are 10 time slots from 0 to 9 in a 50 G FlexE service. The even time slots 0, 2, 4, 6 and 8 in the original service flow are reserved in the first service flow after de-interleaving; and the odd time slots 1, 3, 5, 7, 9 in the original service flow are reserved in the second service flow. Overhead block contents are filled in divided two service flows. The method for filling the overhead block content will be described hereinafter.

The first overhead block position (overhead array 0:0) is used in the original multi-frame as the first overhead block position in the multi-frame of the new two service flows.

The overhead blocks are only filled in the positions of even blocks in the original overhead blocks, such as 0:0, 0:2, 0:4, 0:6, 1:0, 1:2, 1:4, 1:6, . . . 15:0, 15:2, 15:4, 15:6, rather than in the positions of odd blocks. A multi-frame of each 25 G service flow is filled with 64 overhead blocks, which is half the number of overhead blocks in a multi-frame of the 50 G service flow. Other overhead blocks which are not filled with the overhead block content are directly deleted.

In the overhead block of the 25 G service flow, the C bit, the RPF field, the CR field and the CA field are directly copied from the corresponding content in the original overhead block. The lower 6 bits (0-5 bits) of the PHY number field are copied directly from the lower 0-5 bits of the PHY number field of the original overhead block. The highest 2 bits of the PHY number fields Client calendar represent the service flow. The Client calendar A and the Client calendar B are positioned in the third block in a frame, which come from the corresponding content of the original overhead block. The overhead fields Client calendar A and Client calendar B in the first 25 G service flow come from the corresponding overhead block contents of the even frames in the original 50 G service flow, such as the 0th, 2nd, 4th . . . 14th frames; and the overhead fields Client calendar A and Client calendar B in the second 25 G service flow come from the corresponding contents in the original odd frames in the original 50 G service flow, such as the 1st, 3rd, 5th . . . 15th frames. The processing of the field content of a PHY map, a Management channel-section and a Management channel-shim to shim are similar to the processing of the Client calendar. The field content of the PHY map, the Management channel-section, and the Manage channel-shim to shim in the first 25 G service flow come from the corresponding content of even frames in the original 50 G service flow, such as the 0th, 2nd, 4th . . . 14th frames; and the overhead fields of the PHY map, the Management-section, and the Management channel-shim to shim in the second 25 G service flow come from the corresponding content in the original odd frames in the original 50 G service flow, such as the 1st, 3rd, 5th . . . 15th frames.

The 25 G-rate FlexE service is formed after the filling of the FlexE overhead blocks (the overhead block position where content is not filled is directly deleted), and is transmitted over two 50 G-rate lines.

Two 25 G service flows are interleaved into one 50 G service flow with an overhead block presented at an interval of every 1023*4*5 data blocks in a 25 G-rate FlexE service flow. Two 25 G-rate FlexE service flows are aligned with reference to a FlexE overhead block position (multi-frame boundary) and then interleaved by taking 66-bit blocks as a unit to form a 50 G service flow. After interleaving, the data block is an interleaved result of the data blocks in two 25 G service flows. The overhead block only reserves the position of the overhead block after interleaving, and the overhead block content is not filled temporarily. A 50 G-rate service flow is obtained after interleaving, and two positions of the overhead block are presented at an interval of every 2*1023*2*10 data blocks. One of two consecutive overhead blocks is moved back by 1023*2*10 blocks, so that the FlexE overhead block position is presented at an interval of every 1023*2*10 blocks. The rule of filling the 50 G service flow in the overhead block position with content will be described hereinafter.

Taking a multi-frame as a unit, 8 overhead blocks in each frame of a first 25 G service flow are filled in 8 overhead block positions in the even frame in a 50 G service flow, and 8 overhead blocks in each frame of the second 25 G service flow are filled in 8 overhead block positions in the odd frame in the 50 G service flow. In particular, 8 overhead blocks of the 0th frame in the first 25 G service multi-frame are filled in 8 overhead block positions of the 0th frame in the 50 G service flow (for example, A 0:0 is filled in 0:0, A 0:1 is filled in 0:1, A 0:3 is filled in 0:3 . . . A 0:7 is filled in 0:7), and then 8 overhead blocks of the 0th frame in the second 25 G service flow multi-frame are filled in 8 overhead block positions of the 1st frame in the 50 G service flow (for example, B 0:0 is filled in 1:0, B 0:1 is filled in 1:1, B 0:3 is filled in 1:3 . . . B 0:7 is filled in 1:7). After the first round of filling is finished, the second round of filling starts. 8 overhead blocks of the 1st frame in the multi-frame of the first 25 G service flow are filled in 8 overhead block positions of the 2nd frame in the multi-frame of the 50 G service flow, and 8 overhead blocks of the 1st frame in the multi-frame of the second 25 G service flow are filled in 8 overhead block positions of the 3rd frame in the multi-frame of 50 G service flow, in a similar fashion.

For the 25 G FlexE frame, the maximum number of group members is 64. Thus, the PHY number field is only valid in the lower 6 bits of the field of the PHY number, and the highest 2 bits may be used to indicate the service flow. When the overhead blocks in the 25 G FlexE frame are filled in the 50 G service flow, the highest 2 bits of the PHY number field are set to "0", and other usages are cleared.

After the overhead block is filled, a 50 G member FlexE protocol information flow is formed, which can constitute a group with other 50 G-rate members to restore the client service.

The above examples are several implementations of the present disclosure, and various combinations and implementations are possible for different client services having different rates and PHYs having different rates. It should be noted that, in the above embodiments, the steps of interleaving and de-interleaving are performed by taking 1 data block as a unit. However, the present disclosure is not limited thereto. In other embodiments, the step of interleaving and de-interleaving may be performed in a unit of a plurality of data blocks or other number of bits.

Figure 24:
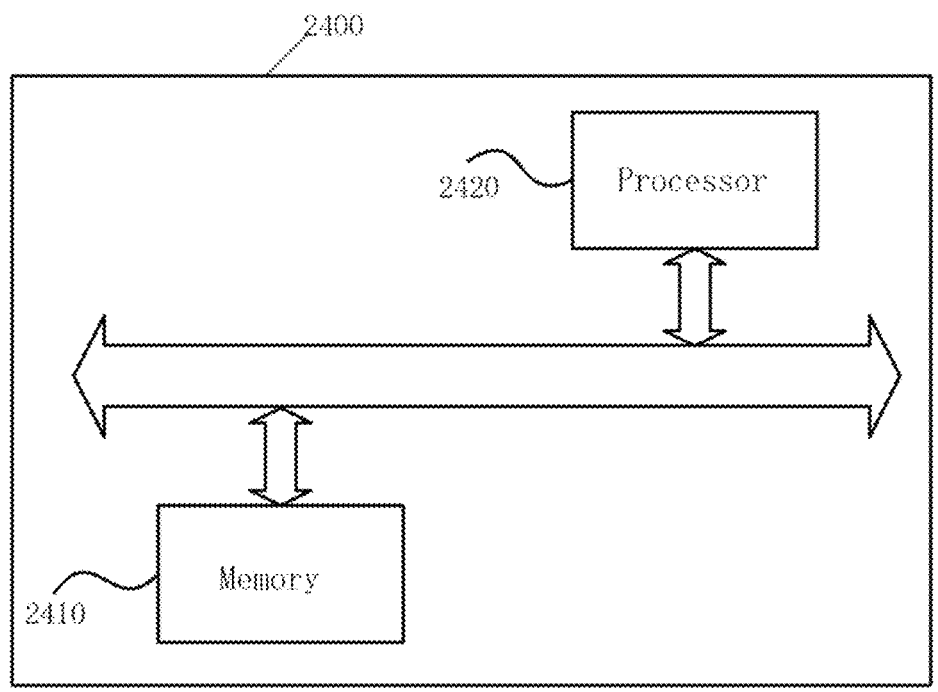
FIG. 24 is a block diagram illustrating a service transmitting device according to an embodiment of the present disclosure.

As shown in FIG. 24, in an embodiment of the present disclosure, there is provided a service transmitting device 2400, including a memory 2410 and a processor 2420, wherein the memory 2410 stores a program, and the program, when read and executed by the processor, implements steps of:

mapping a client service to at least one service flow of a first rate;

dividing at least one service flow of a first rate into a plurality of service flows of other rates, and filling the service flows of other rates with overhead blocks; and transmitting the service flows through channels of corresponding rates.

In other embodiments, when read and executed by the processor, the program further executes the service transmitting method according to any one of the above embodiments.

In an embodiment of the present disclosure, there is provided a computer-readable storage medium, which stores one or more programs, where the one or more programs are executable by one or more processors to implement the service receiving method according to any of the above embodiments.

Figure 25:
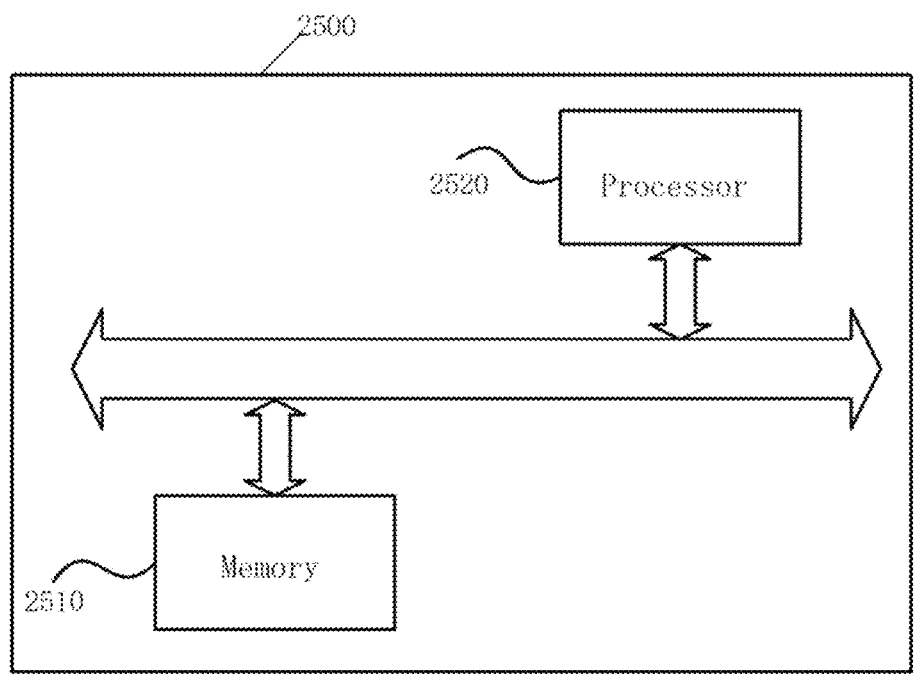
FIG. 25 is a block diagram illustrating a service receiving device according to an embodiment of the present disclosure.

As shown in FIG. 25, In an embodiment of the present disclosure, there is provided a service receiving device 2500, including a memory 2510 and a processor 2520, wherein the memory 2510 stores a program, and the program, when read and executed by the processor 2520, implements the following operations:

interweaving a plurality of service flows of a first rate to form a service flow of the first rate;

filling the service flow of the first rate with overhead block content; and restoring the client service from the service flow of the first rate.

In other embodiments, the program, when read and executed by the processor, further executes the service receiving method according to any one of the above embodiments.

In an embodiment of the present disclosure, there is provided a computer-readable storage medium, which stores one or more programs, where the one or more programs are executable by one or more processors to implement the service receiving method according to any one of the above embodiments.

The computer-readable storage medium includes various media capable of storing program codes, such as a U-disk, a Read-Only Memory (ROM), a Random Access Memory (RAM), a removable hard disk, a magnetic disk, or an optical disk.

Although the embodiments of the present disclosure are described above, the descriptions are only for the purpose of understanding the present disclosure, and are not intended to limit the present disclosure. It will be appreciated by those skilled in the art of the present disclosure that various modifications and changes in form and details may be made therein without departing from the spirit and scope of the present disclosure. The scope of the disclosure will merely be restricted by the appended claims.

INDUSTRIAL APPLICABILITY

The present disclosure relates to the field of communications. In the technical scheme of the disclosure, a client service is mapped to at least one service flow of a first rate; at least one service flow of the first rate is divided into a plurality of service flows of other rates; the service flows of other rates are filled with overhead content; and the service flow is transmitted through channels of corresponding rates. By means of the scheme according to the disclosure, a service transmission between members of different rates can be implemented.

The invention claimed is:

1. A service transmitting method, comprising:
mapping a client service to a FlexE (Flexible Ethernet) frame to form at least one service flow of a first rate with a FlexE frame structure;
dividing the at least one service flow of the first rate with the FlexE frame structure into a plurality of service flows of other rates, and filling the service flows of other rates with overhead blocks, wherein dividing the at least one service flow of the first rate into the plurality of service flows of other rates includes: dividing data blocks of the at least one service flow of the first rate into a plurality of service flows of a second rate according to a first de-interleaving process of interleaving sequence by taking a single data block as a unit, and reserving blank overhead blocks at positions of the service flows of the second rate corresponding to overhead block positions of the service flow of the first rate; dividing data blocks of the service flows of the second rate into a plurality of service flows of a third rate according to a second de-interleaving process of interleaving sequence by taking a single data block as a unit, and reserving blank overhead blocks at positions of the service flows of the third rate corresponding to overhead block positions of the service flows of the second rate; and
transmitting the service flows through channel of corresponding rates.

2. The service transmitting method according to claim 1, wherein dividing the at least one service flow of the first rate into the plurality of service flows of other rates comprises:
dividing at least one service flow having a rate of 100G into two service flows having a rate of 50G; or
dividing the at least one service flow having the rate of 100G into four service flows having a rate of 25G; or
dividing the at least one service flow having the rate of 100G into two service flows having a rate of 50G and dividing one of the services flows having the rate of 50G into two service flows having the rate of 25G; or
dividing at least one service flow having a rate of 50G into two service flows having the rate of 25G.

3. The service transmitting method according to claim 1, wherein filling the service flows of other rates with the overhead blocks comprises at least one step of:
when the at least one service flow having the rate of 100G is divided into the two service flows having the rate of 50G, from a first overhead block position, the 0th overhead block position, of a multi-frame, only filling overhead blocks in each of service flows having the rate of 50G at even overhead block positions with overhead block content, and discarding overhead blocks which are not filled with the overhead block content, wherein a Calendar configuration bit (C-bit) field, an Remote PHY Fault (RPF) field, a Calendar Request (CR) field, a Calendar Acknowledge (CA) field and lower 7-bit contents of a physical layer (PHY) number field filled in the overhead blocks come from the corresponding contents of the overhead block corresponding to the overhead block position in the at least one service flow having the rate of 100G; the highest bit of the PHY number field is filled with indication information for distinguishing the service flows; rest field contents of the overhead blocks in the first service flow having the rate of 50G come from the corresponding fields of the overhead blocks of an even frame in the at least one service flow having the rate of 100G; and rest field contents of the overhead blocks in the second service flow having the rate of 50G come from the corresponding field of the overhead blocks of an odd frame in the at least one service flow having the rate of 100G;
when each of service flows having the rate of 50G is divided into the two service flows having the rate of 25G, from the first overhead block position, the 0th overhead block position, of a multi-frame, only filling overhead blocks at even overhead block positions with overhead block contents, and discarding overhead blocks which are not filled with the overhead block content, wherein a C-bit field, an RPF field, a CR field, a CA field and lower 7-bit contents of a PHY number field filled in the overhead block come from the corresponding contents of the overhead block corresponding to the overhead block position in the service flow having the rate of 50G; the highest bit of the PHY number field is filled with indication information for distinguishing the service flows, rest field contents of the overhead block in the first service flow having the rate of 25G come from the corresponding field of the overhead block of an even frame in the service flow having the rate of 50G; and rest field contents of the overhead block in the second service flow having the rate of 25G come from the corresponding field of the overhead block of an odd frame in the service flow having the rate of 50G; and when the at least one service flow having the rate of 100G is divided into the four service flows having the rate of 25G, from the first overhead block position, the 0th overhead block position, of a multi-frame, only filling overhead blocks at a position that is an integral multiple of 4 with overhead block content, and discarding overhead blocks which are not filled with the overhead block content, wherein lower 6-bit contents of a C-bit field, an RPF field, a CR field, a CA field and a PHY number field filled in the overhead block come from the corresponding content of the overhead block corresponding to the overhead block position in the at least one service flow having the first rate; the highest 2 bits of the PHY number field are filled with indication information for distinguishing service flows, rest field contents of the overhead block in the first service flow having the rate of 25G come from the corresponding content of an overhead block of the 4Nth frame in the service flow having the rate of 100G, where N is an integer greater than or equal to 0; rest field contents of the overhead block in the second service flow having the rate of 25G come from the corresponding field of an overhead block of the (4N+1)th frame in the service flow having the rate of 100G; rest field contents of the overhead block in the third service flow having the rate of 25G come from the corresponding field of an overhead block of the (4N+2)th frame in the service flow having the rate of 100G; rest field contents of overhead block in the fourth service flow having the rate of 25G come from the corresponding field of an overhead block of the (4N+3)th frame in the service flow having the rate of 100G.

4. A service transmitting device, comprising a memory and a processor, wherein the memory stores a program, and the program, when read and executed by the processor, implements the service transmitting method according to claim 1.

5. A non-transitory computer storage medium having instructions stored thereon, wherein the instructions, when executed by the processor, implement the service transmitting method according to claim 1.

6. A service receiving method, comprising:
  interleaving a plurality of service flows of a rate lower than a first rate to form a service flow of the first rate with a FlexE frame structure, wherein the service flow of the first rate with a FlexE frame structure is formed by mapping a client service to a FlexE (Flexible Ethernet) frame, wherein interleaving the plurality of service flows of the rate lower than the first rate to form the service flow of the first rate comprises: interleaving the plurality of service flows of a third rate to form a plurality of service flows of a second rate in an interleaved manner by taking one data block as a unit after aligning multi-frame boundaries of the service flows to be interleaved, and dispersing interleaved overhead blocks, and interleaving the plurality of service flows of the second rate to form the service flow of the first rate in an interleaved manner by taking one data block as a unit after aligning multi-frame boundaries of the service flows to be interleaved, and dispersing interleaved overhead blocks, the third rate being lower than the second rate and the second rate being lower than the first rate;
  filling the service flow of the first rate with the overhead block content; and
  restoring the client service from the service flow of the first rate.

7. The service receiving method according to claim 6, wherein
  interleaving the plurality of service flows of the rate lower than the first rate to form the service flow of the first rate comprises:
  interleaving two service flows having a rate of 50G to form a service flow having a rate of 100G; or
  interleaving four service flows having a rate of 25G to form a service flow having a rate of 100G; or
  interleaving two service flows having a rate of 25G to form a service flow having a rate of 50G, and interleaving the service flow having a rate of 50G with another service flow having a rate of 50G to form a service flow having a rate of 100G.

8. The service receiving method according to claim 6, wherein adjacent overhead blocks are spaced at an interval of 1023*20 data blocks.

9. The service receiving method according to claim 8, wherein filling the service flow of the first rate with the overhead block content comprises at least one step of:
  when two service flows having a rate of 50G are interleaved to form a service flow having a rate of 100G, from the multi-frame boundary, sequentially filling the overhead block contents in the multi-frame of the first service flow having the rate of 50G in a position corresponding to an overhead block in an even frame of the multi-frame of the service flow having the rate of 100G, sequentially filling the overhead block content in the multi-frame of the second service flow having the rate of 50G in a position corresponding to an overhead block in an odd frame in the multi-frame of the service flow having the rate of 100G; and clearing highest bit of the PHY number field;
  when four service flows having a rate of 25G are interleaved to form a service flow having a rate of 100G, from the multi-frame boundary, sequentially filling overhead block contents in the multi-frame of the first service flow having the rate of 25G in a position corresponding to an overhead block in a 4Nth frame of the multi-frame of the service flow having the rate of 100G, wherein N is an integer greater than or equal to 0; sequentially filling the overhead block content in the multi-frame of the second service flow having the rate of 25G in a position corresponding to an overhead block in a (4N+1)th frame of the multi-frame of the service flow having the rate of 100G; sequentially filling overhead block contents in the multi-frame of the third service flow having the rate of 25G in a position corresponding to an overhead block in a (4N+2)th frame of the multi-frame of the service flow having the rate of 100G; sequentially filling overhead block contents in the multi-frame of the fourth service flow having the rate of 25G in a position corresponding to the overhead block in a (4N+3)th frame of the multi-frame of the service flow having the rate of 100G; and clearing the highest 2 bits of the PHY number field when two service flows having a rate of 25G are interleaved to form a service flow having a rate of 50G, sequentially filling overhead block contents in the multi-frame of the first service flow having the rate of 25G in a position corresponding to an overhead block in an even frame of the multi-frame of the service flow having the rate of 50G; sequentially filling overhead block contents in the multi-frame of the second service flow having the rate of 25G in a position corresponding to the overhead block in an odd frame of the multi-frame of the service flow having the rate of 50G; and clearing the highest 2 bits of the PHY number field.

10. A service receiving device, comprising: a memory and a processor, wherein the memory stores a program, and the program, when read and executed by the processor, implements the service receiving method according to claim 6.

11. A non-transitory computer storage medium having instructions stored thereon, wherein the instructions, when executed by a processor, implement the service receiving method according to claim 6.

\* \* \* \* \*